US012333063B2

(12) United States Patent
Kang et al.

(10) Patent No.: US 12,333,063 B2
(45) Date of Patent: Jun. 17, 2025

(54) ELECTRONIC DEVICE FOR CONTROLLING VIRTUAL OBJECT BASED ON DISTANCE BETWEEN VIRTUAL OBJECTS AND METHOD THEREOF

(71) Applicant: SAMSUNG ELECTRONICS CO., LTD., Suwon-si (KR)

(72) Inventors: Seonghoon Kang, Suwon-si (KR); Joayoung Lee, Suwon-si (KR); Jinseon Yoo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/408,207

(22) Filed: Jan. 9, 2024

(65) Prior Publication Data
US 2024/0288930 A1    Aug. 29, 2024

Related U.S. Application Data

(63) Continuation of application No. PCT/KR2023/018861, filed on Nov. 22, 2023.

(30) Foreign Application Priority Data

Feb. 27, 2023    (KR) .................. 10-2023-0026052

(51) Int. Cl.
*G06F 3/01*    (2006.01)
*G06T 7/60*    (2017.01)
(Continued)

(52) U.S. Cl.
CPC ............... *G06F 3/011* (2013.01); *G06T 7/60* (2013.01); *G06T 7/70* (2017.01); *G06V 40/20* (2022.01); *G06F 3/017* (2013.01)

(58) Field of Classification Search
CPC ............ G06F 3/011; G06F 3/017; G06T 7/60; G06T 7/70; G06V 40/20
See application file for complete search history.

(56) References Cited

U.S. PATENT DOCUMENTS 9,259,643 B2    2/2016  Lansdale et al.
9,566,509 B2    2/2017  Paquet et al.
(Continued)

FOREIGN PATENT DOCUMENTS

JP    2021-135776 A    9/2021
JP    2022-144864 A    10/2022
(Continued)

OTHER PUBLICATIONS

International Search Report (PCT/ISA/210) issued on Mar. 13, 2024 by the International Searching Authority in International Application No. PCT/KR2023/018861.
(Continued)

*Primary Examiner* — Antonio Xavier
(74) *Attorney, Agent, or Firm* — Sughrue Mion, PLLC

(57) ABSTRACT

An electronic device includes: a communication circuit; a camera; a display; and a processor configured to: display, while providing virtual service, a first virtual object through the display; identify a distance between the first virtual object and a second virtual object corresponding to a user of the electronic device; based on identifying that the distance is equal to or less than a reference distance, activate the camera; identify a state of the user based on at least one image obtained by using the activated camera; and transmit, to an external electronic device through the communication circuit, data for changing a state of the second virtual object displayed through a display of the external electronic device, based on the identified state of the user.

20 Claims, 13 Drawing Sheets

(51) Int. Cl.
*G06T 7/70* (2017.01)
*G06V 40/20* (2022.01)

(56) References Cited

U.S. PATENT DOCUMENTS

| | | | |
|---|---|---|---|
| 9,746,912 B2 | 8/2017 | Meijer et al. | |
| 11,062,519 B2 | 7/2021 | Lee | |
| 11,127,182 B2 | 9/2021 | Mirhosseini et al. | |
| 11,350,033 B2 | 5/2022 | An et al. | |
| 11,527,020 B2 | 12/2022 | Katsumata et al. | |
| 11,832,048 B2 | 11/2023 | Jo et al. | |
| 2010/0070885 A1* | 3/2010 | Bromenshenkel | G06F 3/011 715/757 |
| 2018/0011317 A1* | 1/2018 | Hasegawa | G06F 3/0481 |
| 2019/0130648 A1* | 5/2019 | Duca | G06T 19/006 |
| 2019/0320293 A1* | 10/2019 | Ho | H04W 4/029 |
| 2019/0354189 A1* | 11/2019 | Rosedale | A63F 13/798 |
| 2020/0051304 A1* | 2/2020 | Choi | G06F 3/0346 |
| 2020/0118349 A1 | 4/2020 | Amimoto | |
| 2020/0225830 A1* | 7/2020 | Tang | G06F 3/011 |
| 2021/0295602 A1* | 9/2021 | Scapel | G06F 3/04815 |
| 2021/0385428 A1* | 12/2021 | Asherov | H04N 13/282 |
| 2022/0028153 A1* | 1/2022 | Choi | G06F 3/011 |
| 2022/0103963 A1* | 3/2022 | Satongar | H04N 7/147 |
| 2022/0121292 A1* | 4/2022 | Lin | G02B 27/0172 |
| 2023/0120187 A1 | 4/2023 | Uhm et al. | |
| 2023/0410415 A1* | 12/2023 | Richter | G06T 19/006 |
| 2024/0061514 A1* | 2/2024 | Reisman | G06F 3/017 |

FOREIGN PATENT DOCUMENTS

| | | |
|---|---|---|
| JP | 7355483 B2 | 9/2023 |
| KR | 10-2018-0024761 A | 3/2018 |
| KR | 10-1991794 B1 | 6/2019 |
| KR | 10-2019-0104946 A | 9/2019 |
| KR | 10-2022-0008118 A | 1/2022 |

OTHER PUBLICATIONS

Written Opinion (PCT/ISA/237) issued on Mar. 13, 2024 by the International Searching Authority in International Application No. PCT/KR2023/018861.

* cited by examiner

ELECTRONIC DEVICE FOR CONTROLLING VIRTUAL OBJECT BASED ON DISTANCE BETWEEN VIRTUAL OBJECTS AND METHOD THEREOF

CROSS-REFERENCE TO RELATED APPLICATIONS

This application is a by-pass continuation application of International Application No. PCT/KR2023/018861, filed on Nov. 22, 2023, which is based on and claims priority to Korean Patent Application No. 10-2023-0026052, filed on Feb. 27, 2023, in the Korean Intellectual Property Office, the disclosures of which are incorporated by reference herein their entireties.

BACKGROUND

1. Field

The disclosure relates to an electronic device for controlling a virtual object based on a distance between virtual objects and a method thereof.

2. Description of Related Art

In order to provide an enhanced user experience, an electronic device for providing augmented reality (AR), virtual reality (VR), extended reality (XR), video see-through (VST), or mixed reality (MR) services is configured to display computer-generated information in connection with an external object in the real-world.

SUMMARY

Provided are a method and a system to identify a distance (e.g., a virtual distance) between one user's avatar and the other user's avatar in a virtual environment, based on a ratio of the one user's avatar shown in a screen of the other user.

According to an embodiment, an electronic device may comprise a communication circuit, a camera, a display, and a processor. The processor may display, while providing virtual service, a first virtual object through the display. The processor may identify a distance between the first virtual object and a second virtual object corresponding to a user of the electronic device. The processor may activate the camera based on identifying that the distance is equal to or less than a reference distance. The processor may identify a state of the user based on at least one image obtained by using the activated camera. The processor may transmit, to an external electronic device through the communication circuit, data for changing a state of the second virtual object displayed through a display of the external electronic device based on the identified state of the user.

According to an embodiment, a method of an electronic device may comprise displaying, while providing virtual service, a first virtual object through a display of the electronic device. The method may comprise identifying a distance between the first virtual object and a second virtual object corresponding to a user of the electronic device. The method may comprise activating a camera based on identifying that the distance is equal to or less than a reference distance. The method may comprise identifying a state of the user based on at least one image obtained by using the activated camera. The method may comprise transmitting, to an external electronic device through a communication circuit, data for changing a state of the second virtual object displayed through a display of the external electronic device, based on the state of the user.

According to an embodiment, a computer-readable storage medium storing one or more programs, wherein the one or more programs, when being executed by a processor of an electronic device, may cause the processor of the electronic device to display, while providing virtual service, a first virtual object through a display. The one or more programs, when being executed by the processor of the electronic device, may cause the processor of the electronic device to identify a distance between the first virtual object and a second virtual object corresponding to a user of the electronic device. The one or more programs, when being executed by the processor of the electronic device, may cause the processor of the electronic device to activate a camera based on identifying that the distance is equal to or less than a reference distance. The one or more programs, when being executed by the processor of the electronic device, may cause the processor of the electronic device to identify a state of the user based on at least one image obtained by using the activated camera. The one or more programs, when being executed by the processor of the electronic device, may cause the processor of the electronic device to transmit, to an external electronic device through a communication circuit, data for changing a state of the second virtual object corresponding to the user displayed through a display of the external electronic device based on the state of the user.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Hereinafter, various embodiments of the disclosure will be described with reference to the accompanying drawings.

The terms as used in the disclosure are provided to merely describe specific embodiments, not intended to limit the scope of other embodiments. Singular forms include plural referents unless the context clearly dictates otherwise. The terms and words as used herein, including technical or scientific terms, may have the same meanings as generally understood by those skilled in the art. The terms as generally defined in dictionaries may be interpreted as having the same or similar meanings as or to contextual meanings of the relevant art. Unless otherwise defined, the terms should not be interpreted as ideally or excessively formal meanings. Even though a term is defined in the disclosure, the term should not be interpreted as excluding embodiments of the disclosure under circumstances.

Before undertaking the detailed description below, it may be advantageous to set forth definitions of certain words and phrases used throughout the present disclosure. The term "couple" and the derivatives thereof refer to any direct or indirect communication between two or more elements, whether or not those elements are in physical contact with each other. The terms "transmit", "receive", and "communicate" as well as the derivatives thereof encompass both direct and indirect communication. The terms "include" and "comprise", and the derivatives thereof refer to inclusion without limitation. The term "or" is an inclusive term meaning "and/or". The phrase "associated with," as well as derivatives thereof, refer to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" refers to any device, system, or part thereof that controls at least one operation. Such a controller may be implemented in hardware or a combination of hardware and software and/or firmware. The functionality associated with any particular controller may be centralized or distributed, whether locally or remotely.

Figure 1:
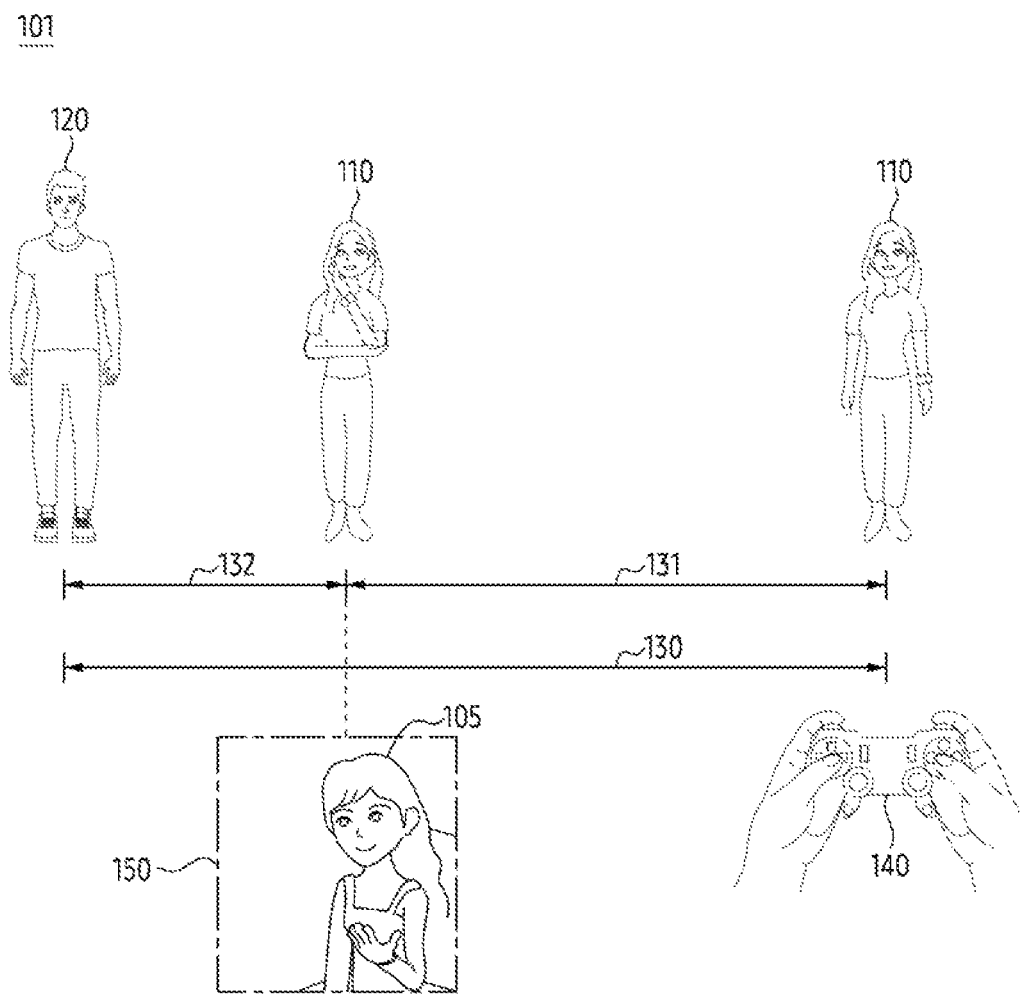
FIG. 1 illustrates an example related to distances between a first virtual object and a second virtual object corresponding to users of electronic devices, according to an embodiment.

FIG. 1 illustrates an example related to distances between a first virtual object and a second virtual object corresponding to users of an electronic device, according to an embodiment.

According to an embodiment, an electronic device 101 may perform functions related to at least one virtual service like augmented reality (AR), mixed reality (MR), video see-through (VST), or virtual reality (VR). For example, the electronic device 101 may display a screen (or a display) related to the at least one virtual service. For example, within the at least one virtual service, the electronic device 101 may control a virtual object (e.g., an avatar) corresponding to the electronic device 101. For example, the electronic device 101 may display a first virtual object 120 controlled by an external electronic device while providing the at least one virtual service. For example, the electronic device 101 and the external electronic device may provide the at least one virtual service based on a second external electronic device (e.g., a server) different from a first external electronic device.

In FIG. 1, according to an embodiment, the electronic device 101 may display the first virtual object 120 while providing the virtual services. For example, the first virtual object 120 may include an avatar corresponding to a user of the external electronic device. For example, the electronic device 101 may receive an input indicating to select the first virtual object while displaying the first virtual object 120. The electronic device 101 may identify the input based on a controller 140 connected through a communication circuit. Based on the input, the electronic device 101 may identify a distance 130 between the first virtual object 120 corresponding to the input and a second virtual object 110 corresponding to the user 105 of the electronic device 101. For example, the electronic device 101 may identify the distance 130 between the first virtual object 120 and the second virtual object 110, based on a size of the first virtual object 120 displayed through the screen (or the display) of the electronic device 101. For example, the electronic device 101 may identify the distance 130 between the first virtual object 120 and the second virtual object 110, based on a first coordinate value corresponding to the first virtual object 120 and a second coordinate value corresponding to the second virtual object 110.

According to an embodiment, the electronic device 101 may identify whether the distance between the first virtual object 120 and the second virtual object 110 is within a reference distance (or a threshold distance) 132. For example, the electronic device 101 may identify that the distance between the first virtual object 120 and the second virtual object 110 is within the reference distance 132, based on identifying that the size of the first virtual object 120 displayed through the display is equal to or greater than a reference size. The operation of identifying the reference distance 132 based on the size of the first virtual object 120 will be described later with reference to FIG. 3. For example, the electronic device 101 may receive the first coordinate value of the first virtual object 120 from the external electronic device and/or a server. For example, the first coordinate value may be referred to as (x1, y1). The electronic device 101 may receive the second coordinate value of the second virtual object 110 corresponding to the user of the electronic device 101 through the communication circuit. For example, the second coordinate value may be referred to as (x2, y2). The electronic device 101 may identify the distance 130 between the first virtual object 120 and the second virtual object 110 based on the first coordinate value and the second coordinate value. For example, the distance 130 obtained based on the coordinate values may be referred to as [Equation 1] below.

$$r = \sqrt{(x2-x1)^2 + (y2-y1)^2} \qquad \text{[Equation 1]}$$

In the Equation 1, r may be the distance 130 between the first virtual object 120 and the second virtual object 110. The electronic device 101 may identify that the distance 130 between the first virtual object 120 and the second virtual object 110 is within the reference distance 132, based on the "r" value being identified as being within the reference value.

According to an embodiment, the electronic device 101 may identify the distance 130 between the first virtual object 120 and the second virtual object 110. The electronic device 101 may identify that the distance 130 is within the reference distance 132. The electronic device 101 may activate a camera based on identifying that the distance 130 is within the reference distance 132. The electronic device 101 may obtain an image 150 by using the activated camera. The electronic device 101 may identify a state of the user 105 based on the image 150. In an embodiment, the state of the user 105 may include a body motion of the user 105. For example, the body motion of the user 105 may include information related to an arm motion of the user 105 or information related to a hand motion. However, it is not limited to this. For example, the state of the user 105 may include a face motion of the user 105. For example, the face motion of the user 105 may include information related to a facial expression of the user 105. For example, the face motion of the user 105 may include information related to blinking of the eyes of the user 105 or information related to a movement of the lips of the user 105. However, embodiments are not limited to this. According to an embodiment, based on the identified state of the user 105, the electronic device 101 may transmit data related to the state of the user 105 to the external electronic device through the communication circuit. For example, based on the identified state of the user 105, the electronic device 101 may transmit data for changing a state of the second virtual object 110 corresponding to the user 105 displayed through the display of the external electronic device based on the state of the user 105. For example, the state of the second virtual object 110 may be related to the display of the second virtual object 110. For example, the external electronic device may change the display of the second virtual object 110 corresponding to the state of the user 105 based on the received data.

According to an embodiment, the electronic device 101 may identify that the distance 130 between the first virtual object 120 and the second virtual object 110 is outside the reference distance 132. For example, when the distance 131 is outside the reference distance 132, the electronic device 101 may control the second virtual object 110 based on the controller 140. For example, the electronic device 101 may control the movement of the second virtual object 110 and/or the motion of the second virtual object 110. The electronic device 101 may control the second virtual object 110 based on the camera and the controller 140 when the second virtual object 110 is within the reference distance 132. The electronic device 101 may transmit data for controlling the second virtual object 110 to the external electronic device. The external electronic device may display the second virtual object 110 corresponding to the data based on the received data. The external electronic device may activate the camera of the external electronic device when the second virtual object 110 is within the reference distance 132. The external electronic device may transmit data for changing the state of the first virtual object 120 corresponding to the user of the external electronic device to the electronic device 101, based on at least one image obtained by using the activated camera. The electronic device 101 may change the state of the first virtual object 120 based on the data transmitted from the external electronic device.

As described above, according to an embodiment, the electronic device 101 may provide the at least one virtual service through the display. The electronic device 101 may display the first virtual object 120 corresponding to the external electronic device while providing the at least one virtual service. The electronic device 101 may identify the distance 130 between the first virtual object 120 and the second virtual object 110 corresponding to the user of the electronic device 101. The electronic device 101 may activate the camera of the electronic device 101 based on identifying that the distance 130 is within the reference distance 132. Based on identifying that the distance between the first virtual object 120 and the second virtual object 110 is outside the reference distance 132, the electronic device 101 may control the second virtual object 110 based on the controller 140. Based on identifying that the distance between the first virtual object 120 and the second virtual object 110 is within the reference distance 132, the electronic device 101 may control the second virtual object 110 based on the controller 140 and at least one image 150 obtained by using the activated camera. Based on the identified state of the user 105 and based on the at least one image 150 obtained by using the activated camera, the electronic device 101 may transmit data for changing the state of the second virtual object corresponding to the user displayed through the display of the external electronic device based on the state of the user 105, to the external electronic device through the communication circuit. Based on identifying that the distance between the first virtual object 120 and the second virtual object 110 is within the reference distance 132, the electronic device 101 may reduce power consumption of the electronic device 101 by activating the camera. Based on identifying that the distance between the first virtual object 120 and the second virtual object 110 is within the reference distance 132, the electronic device 101 may receive data for changing the state of the first virtual object 120 from the external electronic device. The electronic device 101 may change the state of the first virtual object 120 based on the received data. The electronic device 101 may enhance the user experience of the electronic device 101 by changing the state of the first virtual object 120 based on the received data.

Figure 2:
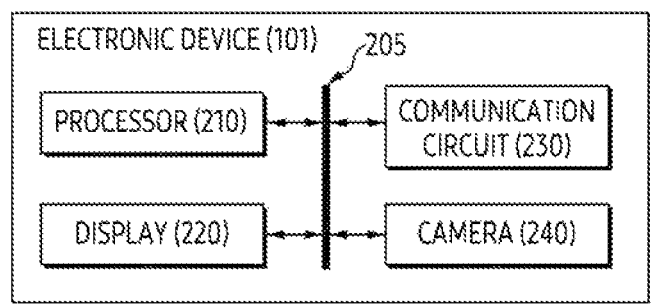
FIG. 2 illustrates an example of an electronic device, according to an embodiment.

FIG. 2 illustrates an example of an electronic device, according to an embodiment. An electronic device 101 of FIG. 2 may correspond to the electronic device 101 of FIG. 1.

In FIG. 2, according to an embodiment, the electronic device 101 may include at least one of a processor 210, a display 220, a communication circuit 230, or a camera 240. The processor 210, the display 220, the communication circuit 230, and the camera 240 may be electronically and/or operably coupled with each other by an electronic component such as a communication bus 205. Hereinafter, that hardware is operably coupled with each other may mean that a direct connection or an indirect connection between hardware is established wired and/or wirelessly so that the second hardware is controlled by the first hardware among the hardware. Although illustrated based on different blocks, the embodiment is not limited thereto, and some (e.g., at least some of the processor 210 and the communication circuit 230) of the hardware of FIG. 2 may be included in a single integrated circuit such as a system on a chip (SoC). The type and/or number of hardware included in the electronic device 101 are not limited as illustrated in FIG. 2. For example, the electronic device 101 may include only some of the hardware components illustrated in FIG. 2.

According to an embodiment, the processor 210 of the electronic device 101 may include hardware for processing data based on one or more instructions. The hardware for processing data may include, for example, an arithmetic and logic unit (ALU), a floating point unit (FPU), a field programmable gate array (FPGA), a central processing unit (CPU), and/or an application processor (AP). The processor 210 may have the structure of a single-core processor, or may have the structure of a multi-core processor such as a dual core, quad core, or hexa core. Hereinafter, operations of the electronic device 101 may be performed by the processor 210.

According to an embodiment, the display (or the screen) 220 of the electronic device 101 may output visualized information to a user (e.g., the user 105 of FIG. 1). For example, the display 220 may output visualized information to the user, by being controlled by the processor 210 including a circuit such as a graphic processing unit (GPU). The display 220 may include a flat panel display (FPD) and/or electronic paper. The FPD may include a liquid crystal display (LCD), a plasma display panel (PDP), and/or one or more light emitting diodes (LEDs). The LED may include an organic LED (OLED).

According to an embodiment, the communication circuit 230 of the electronic device 101 may include a hardware component for supporting transmission or reception of electrical signals between the electronic device and an external electronic device. The communication circuit 230 may include, for example, at least one of a modem (MODEM), an antenna, and an optic/electronic (O/E) converter. The communication circuit 230 may support transmission and/or reception of electrical signals based on various types of protocols, such as Ethernet, local area network (LAN), wide area network (WAN), wireless fidelity (WiFi), Bluetooth, Bluetooth low energy (BLE), ZigBee, long term evolution (LTE) and 5G new radio (NR).

According to an embodiment, the camera 240 of the electronic device 101 may include one or more optical sensors (e.g., a charged coupled device (CCD) sensor and a complementary metal oxide semiconductor (CMOS) sensor) that generate electrical signals indicating the color and/or brightness of light. A plurality of optical sensors included in the camera 240 may be arranged in the form of a 2-dimensional array. The camera 240 may generate 2-dimensional frame data corresponding to light reaching the optical sensors of the 2-dimensional array by obtaining electrical signals of each of the plurality of optical sensors substantially simultaneously. For example, photo data captured by using the camera 240 may mean a 2-dimensional frame data obtained from the camera 240. For example, video data captured by using the camera 240 may mean a sequence of a plurality of 2-dimensional frame data obtained from the camera 240 according to a frame rate. The camera 240 may be disposed toward a direction in which the camera 240 receives light and may further include a flash light for outputting light toward the direction. Although the camera 240 is illustrated based on a single block, the number of cameras 240 included in the electronic device 101 is not limited to the embodiment.

According to an embodiment, the electronic device 101 may provide at least one virtual service through the display 220. The electronic device 101 may display a first virtual object (e.g., the first virtual object 120 of FIG. 1) corresponding to the external electronic device while providing the at least one virtual service. For example, the first virtual object may include an avatar corresponding to a user of the external electronic device. For example, the electronic device 101 may receive information related to a screen representing the at least one virtual service from a second external electronic device (e.g., a server) that is different from the external electronic device (a first external electronic device). For example, the electronic device 101 may receive data (or information) for displaying the first virtual object from the second external electronic device. The electronic device 101 may display a screen corresponding to the data and/or the information based on the received data and/or the information.

According to an embodiment, the electronic device 101 may identify a distance between the first virtual object corresponding to the first external electronic device and a second virtual object (e.g., the second virtual object 110 of FIG. 1) corresponding to the user of the electronic device 101. For example, the distance may be identified based on a first coordinate value corresponding to the location of the first virtual object and a second coordinate value corresponding to the location of the second virtual object. For example, the distance may be identified based on a size of the first virtual object displayed through the display 220 of the electronic device 101. According to an embodiment, the electronic device 101 may identify an input for selecting the first virtual object. For example, the electronic device 101 may identify the input for selecting the first virtual object by using a controller (e.g., the controller 140 of FIG. 1). The electronic device 101 may identify the distance between the first virtual object and the second virtual object based on the selection of the first virtual object. For example, the electronic device 101 may establish a communication link with the controller through the communication circuit 230. The electronic device 101 may establish the communication link with the controller, via wire or wirelessly. The electronic device 101 may control the second virtual object based on the controller with which the communication link is established.

According to an embodiment, the electronic device 101 may identify whether the distance between the first virtual object and the second virtual object is within a reference distance. For example, the electronic device 101 may activate the camera 240 based on identifying that the distance is within the reference distance. For example, the electronic device 101 may control the second virtual object based on the camera 240 and/or the controller in response to the distance within the reference distance. For example, the electronic device 101 may transmit data for controlling the second virtual object to the external electronic device. For example, the electronic device 101 may identify a state of the user of the electronic device 101 based on at least one image (e.g., the image 150 in FIG. 1) obtained by using the activated camera 240. For example, the state of the user may include a body motion of the user and/or a face motion of the user. For example, the body motion of the user may include information related to an arm motion of the user and/or information related to a hand motion of the user. For example, the face motion of the user may include information related to the blinking of the eyes of the user, and/or information related to the movement of the lips of the user. Based on the identified state of the user, the electronic device 101 may transmit data for changing the state of the second virtual object based on the state of the user, to the external electronic device through the communication circuit 230. For example, the second virtual object may be displayed through the display of the external electronic device.

According to an embodiment, the electronic device 101 may identify a size of the first virtual object displayed through the display 220. The electronic device 101 may identify that the distance between the first virtual object and the second virtual object is within the reference distance, based on identifying that the size of the first virtual object is greater than a reference size. A description related to the size of the first virtual object will be described later with reference to FIG. 3.

According to an embodiment, the electronic device 101 may identify that the distance between the first virtual object and the second virtual object is outside the reference distance. For example, based on identifying that the distance outside the reference distance, the electronic device 101 may control the second virtual object by using the controller. The electronic device 101 may identify that the distance between the first virtual object and the second virtual object is within the reference distance. The electronic device 101 may control the second virtual object by using the camera 240 or the controller 140 based on identifying that the distance is within the reference distance. For example, the electronic device 101 may transmit, to the external electronic device, data for controlling the second virtual object.

As described above, according to an embodiment, the electronic device 101 may display the first virtual object corresponding to the user of the external electronic device while providing the at least one virtual service through the display 220. The electronic device 101 may identify the distance between the first virtual object and the second virtual object corresponding to the user of the electronic device 101. The electronic device 101 may activate the camera 240 based on identifying that the distance is within the reference distance. The electronic device 101 may identify the state of the user of the electronic device 101 based on at least one image obtained by using the activated camera 240. Based on the identified state of the user, the electronic device 101 may transmit data for changing the state of the second virtual object displayed through the display of the external electronic device based on the state of the user, to the external electronic device through the communication circuit 230. Based on identifying that the distance between the first virtual object and the second virtual object is within the reference distance, the electronic device 101 may reduce power consumption by activating the camera 240. Based on identifying that the distance between the first virtual object and the second virtual object is within the reference distance, the electronic device 101 may reduce a throughput of the processor 210 by activating the camera 240. Based on identifying that the distance between the first virtual object and the second virtual object is within the reference distance, the electronic device 101 may enhance the user experience of the electronic device 101 by controlling the second virtual object by using the camera 240.

Figure 3:
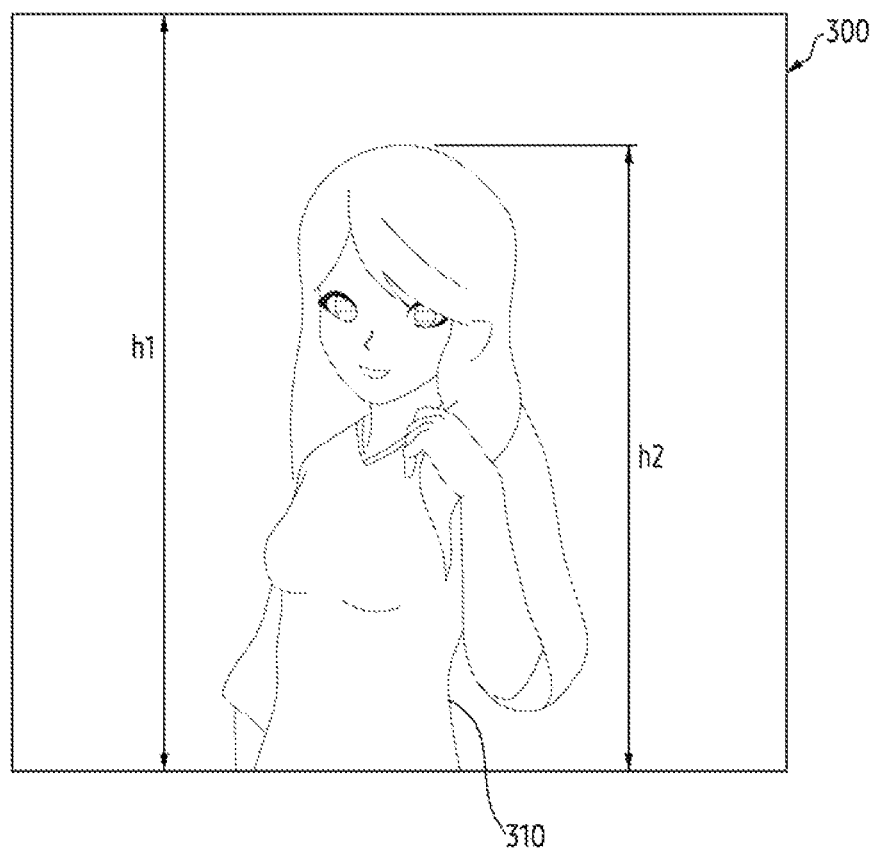
FIG. 3 illustrates an example of a screen (or a display) of an electronic device, according to an embodiment.

FIG. 3 illustrates an example of a screen (or a display) of an electronic device, according to an embodiment. An electronic device 101 of FIG. 3 may correspond to the electronic device 101 of FIG. 1 and/or FIG. 2. Operations of FIG. 3 may be performed by a processor 210 of FIG. 2.

In FIG. 3, according to an embodiment, the electronic device 101 may provide at least one virtual service through a display (e.g., the display 220 of FIG. 2). For example, the electronic device 101 may display a screen 300 related to the at least one virtual service. The electronic device 101 may display a first virtual object 310 corresponding to a user of an external electronic device on the screen 300. The electronic device 101 may identify a distance between the first virtual object 310 and a second virtual object corresponding to the user of the electronic device 101. For example, the electronic device 101 may identify the distance based on a size of the first virtual object 310 displayed through the display. In FIG. 3, the electronic device 101 may identify a height h1 of the screen 300 displayed on the display. For example, the height h1 may be identified based on pixels. For example, the electronic device 101 may identify a height h2 of the first virtual object 310 based on the size of the first virtual object 310 displayed on the screen 300. For example, the size may include the width and height h2 of the first virtual object 310. For example, the electronic device 101 may identify the height h2 based on pixels displaying the first virtual object 310. The electronic device 101 may identify a ratio of the height h2 of the first virtual object 310 to the height h1 of the screen 300. For example, the electronic device 101 may identify whether the ratio is greater than a reference ratio. For example, the ratio may be referred to as 'the height h2 of the first virtual object 310/the height h1 of the screen 300'. For example, the reference ratio may be referred to as '2/3'. For example, the electronic device 101 may control the second virtual object by using a controller, based on the fact that the ratio of the height h2 of the first virtual object 310 to the height h1 of the screen 300 is less than the reference ratio.

According to an embodiment, the electronic device 101 may identify that a distance between the first virtual object 310 and the second virtual object is within a reference distance, based on identifying that the ratio (the ratio of the height h2 of the first virtual object 310 to the height h1 of the screen 300) is greater than the reference ratio. The electronic device 101 may activate a camera (e.g., a camera 240 of FIG. 2), based on identifying that the distance between the first virtual object 310 and the second virtual object is within the reference distance. The electronic device 101 may identify a state of the user of the electronic device 101 based on at least one image obtained by using the activated camera. Based on the identified state of the user, the electronic device 101 may transmit data for changing the state of the second virtual object based on the identified state of the user, to the external electronic device through a communication circuit (e.g., the communication circuit 230 of FIG. 2).

As described above, according to an embodiment, the electronic device 101 may display the screen 300 related to the at least one virtual service. The electronic device 101 may display the first virtual object 310 on the screen 300. The electronic device 101 may identify the distance between the first virtual object 310 and the second virtual object corresponding to the user of the electronic device 101. The electronic device 101 may identify the distance based on the size of the first virtual object 310. The electronic device 101 may identify the distance within the reference distance based on identifying that the size is greater than the reference size. The electronic device 101 may activate the camera in response to the distance within the reference distance. The electronic device 101 may identify the state of the user of the electronic device 101 based on at least one image obtained by using the activated camera. Based on the identified state of the user, the electronic device 101 may transmit, to the external electronic device, data for changing the state of the second virtual object displayed through the display of the external electronic device based on the identified state of the user. The electronic device 101 may control the camera based on the size of the first virtual object 310. The electronic device 101 may use power efficiently by controlling the camera based on the size of the first virtual object 310.

Figure 4A:
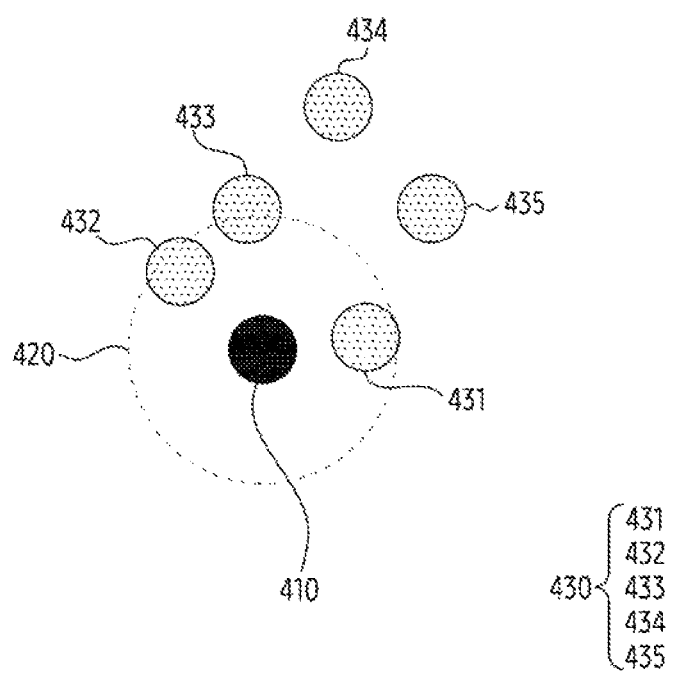
FIG. 4A illustrates an example related to virtual objects corresponding to users of electronic devices, according to an embodiment.
Figure 4B:
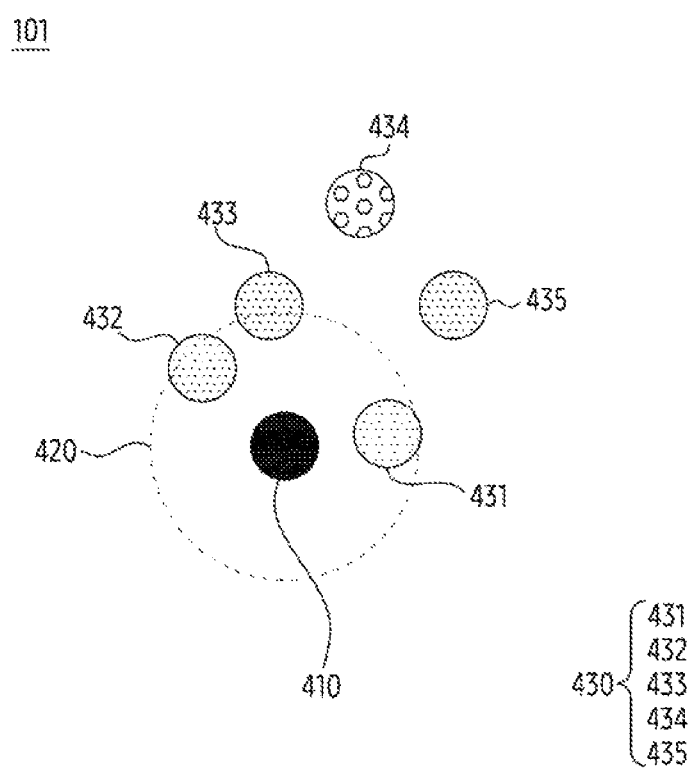
FIG. 4B illustrates an example related to virtual objects corresponding to users of electronic devices, according to an embodiment.
Figure 4C:
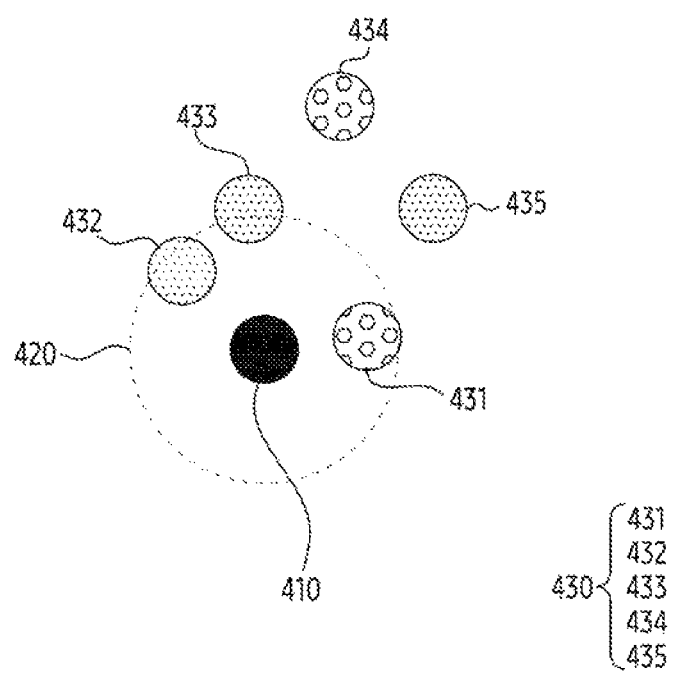
FIG. 4C illustrates an example related to virtual objects corresponding to users of electronic devices, according to an embodiment.

FIG. 4A illustrates an example related to virtual objects corresponding to users of electronic devices, according to an embodiment FIG. 4B illustrates another example related to virtual objects corresponding to users of electronic devices, according to an embodiment. FIG. 4C illustrates yet another example related to virtual objects corresponding to users of electronic devices, according to an embodiment. An electronic device 101 of FIGS. 4A to 4C may correspond to the electronic device 101 of FIGS. 1, 2, and/or 3. Operations of FIGS. 4A to 4C may be performed by the processor 210 of FIG. 2.

In FIGS. 4A to 4C, according to an embodiment, the electronic device 101 may identify one or more virtual objects 430. For example, the electronic device 101 may identify the virtual objects 430 corresponding to each of users of external electronic devices. The electronic device 101 may identify a distance between each of the virtual objects 430 and the virtual object 410 corresponding to the user of the electronic device 101. For example, FIG. 4A may be an example in which an input for selecting the virtual objects 430 corresponding to each user of the external electronic devices has not been received. For example, in a case that the electronic device 101 does not receive the input for selecting the virtual objects 430, the electronic device 101 may maintain a state in which the camera is deactivated.

In FIG. 4B, according to an embodiment, the electronic device 101 may identify the one or more virtual objects 430. The electronic device 101 may identify an input for selecting a first virtual object 434 among the virtual objects 430. For example, the electronic device 101 may identify a distance between the first virtual object 434 and a second virtual object 410 based on an input for selecting the first virtual object 434, based on a controller. For example, the second virtual object 410 may be a virtual object corresponding to the user of the electronic device 101. The electronic device 101 may identify that the first virtual object 434 is outside a reference range 420. For example, the reference range 420 may be a range set around the second virtual object 410 corresponding to the user of the electronic device 101. The electronic device 101 may deactivate the camera even if the electronic device 101 identifies a third virtual object 431 and/or a fourth virtual object 432 that is different from the first virtual object 434 within the reference range 420. For example, the electronic device 101 may activate the camera based on identifying that a selected virtual object is within the reference range 420. In the example of FIG. 4B, the electronic device 101 may deactivate the camera by identifying the first virtual object 434 outside the reference range 420.

In FIG. 4C, according to an embodiment, the electronic device 101 may identify the one or more virtual objects 430. The electronic device 101 may receive an input indicating to select the first virtual object 434 and the third virtual object 431 among the one or more virtual objects 430. The electronic device 101 may identify a first distance between the first virtual object 434 and the second virtual object 410 in response to the input. The electronic device 101 may identify a second distance between the third virtual object 431 and the second virtual object 410 in response to the input. The electronic device 101 may activate the camera based on identifying a distance within the reference range 420 that corresponds to the reference distance among the first distance and the second distance. In the example of FIG. 4C, the electronic device 101 may activate the camera based on identifying that the second distance that is less than the reference distance. The electronic device 101 may transmit data for changing the state of the second virtual object 410, based on the state of the user of the electronic device 101 identified based on at least one image obtained based on the activated camera. The electronic device 101 may transmit the data to the external electronic device that controls the third virtual object identified with the second distance.

As described above, according to an embodiment, the electronic device 101 may identify the one or more virtual objects 430 while providing the at least one virtual service. The electronic device 101 may receive an input for selecting at least one of the one or more virtual objects 430. For example, the electronic device 101 may identify an input for selecting the first virtual object 434 and the third virtual object 431. The electronic device 101 may identify the first distance between the first virtual object 434 and the second virtual object 410. The electronic device 101 may identify the second distance between the third virtual object 431 and the second virtual object 410. The electronic device 101 may activate the camera in response to the second distance within the reference distance. The electronic device 101 may identify the state of the user based on at least one image obtained by using the activated camera. The electronic device 101 may transmit data for changing the state of the second virtual object 410 corresponding to the user of the electronic device 101 displayed through the display of the external electronic device corresponding to the third virtual object 431 based on the state of the user, to the external electronic device through the communication circuit. The electronic device 101 may reduce power consumption by activating the camera in response to identifying the virtual object within the reference range 420 (or the reference distance). Based on identifying that the virtual object is within the reference range 420 (or the reference distance), the electronic device 101 may enhance the user experience of the electronic device 101 by transmitting data corresponding to the user's state obtained by using the camera.

Figure 5:
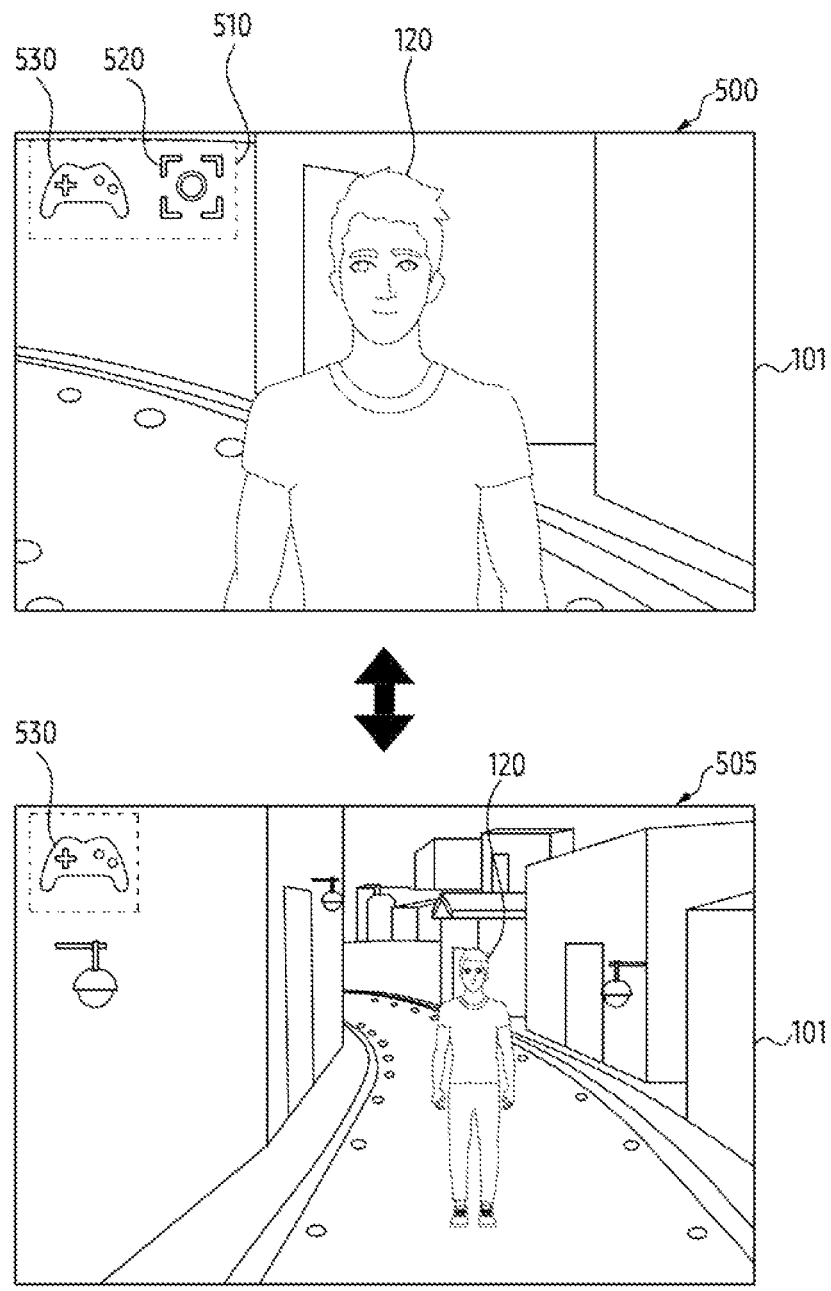
FIG. 5 illustrates an example of screens (or displays) of an electronic device, according to an embodiment.

FIG. 5 illustrates an example of screens (or displays) of an electronic device, according to an embodiment. An electronic device 101 of FIG. 5 may corresponds to the electronic device 101 of FIGS. 1, 2, 3, 4A, 4B, and/or 4C. Operations of FIG. 5 may be performed by a processor 210 of FIG. 2.

In FIG. 5, according to an embodiment, the electronic device 101 may provide the at least one virtual service. For example, the electronic device 101 may display a first screen 500 related to the at least one virtual service. For example, the first screen 500 may be a screen in which the distance between a first virtual object 120 and a second virtual object corresponding to the user of the electronic device 101 is within a reference distance. The electronic device 101 may display the first virtual object 120 while displaying the first screen 500. The electronic device 101 may display a first icon 520 and a second icon 530 respectively corresponding to hardware components for controlling the second virtual object corresponding to the user of the electronic device 101 within the first screen 500. For example, the electronic device 101 may display the icons 520 and 530 on a partial area 510 of the screen 500. For example, within the first screen 500, the electronic device 101 may identify a size of the first virtual object 120. The electronic device 101 may activate a camera (e.g., a camera 240 of FIG. 2) in response to the fact that the size of the first virtual object 120 is greater than a reference size. For example, the operation of identifying the size of the first virtual object 120 that is greater than the reference size may correspond to the operation of identifying the first virtual object 120 within the reference distance. In response to activating the camera, the electronic device 101 may display the first icon 520 for notifying activation of the camera. The electronic device 101 may display the first icon 520 and the second icon 530 for indicating activation of the controller and the camera, which are hardware components for controlling the second virtual object.

A second screen 505 of FIG. 5 may be a screen displaying the first virtual object 120 displayed at a distance between the first virtual object 120 and the second virtual object (for example, the second virtual object 110 in FIG. 1) that is greater than the reference distance. For example, the electronic device 101 may identify the size of the first virtual object 120. The electronic device 101 may identify that the size of the first virtual object 120 is equal to or less than the reference size. The electronic device 101 may control the second virtual object (for example, the second virtual object 110 in FIG. 1) by using the controller, based on the size of the first virtual object 120 that is equal to or less than the reference size. The electronic device 101 may display the second icon 530 for indicating the activated controller.

As described above, according to an embodiment, the electronic device 101 may display one or more icons 520 and 530 for indicating a hardware component for controlling the second virtual object. The electronic device 101 may enhance the user experience of the electronic device 101 by displaying the one or more icons 520 and 530 indicating the hardware component for controlling the second virtual object.

Figure 6A:
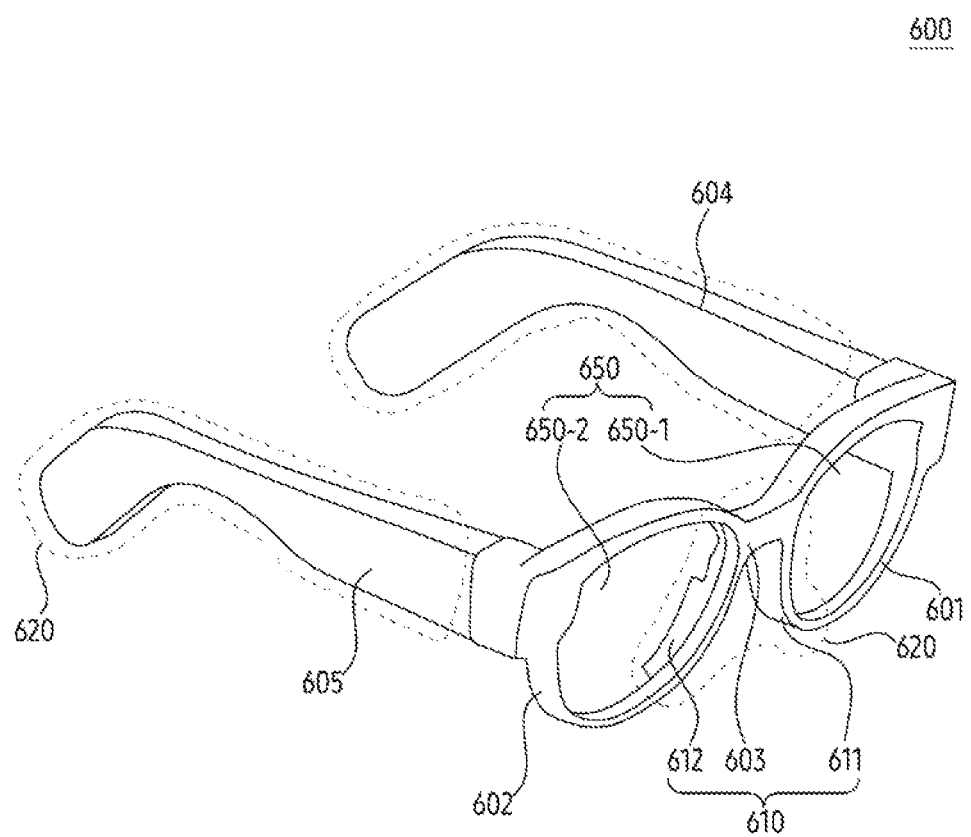
FIG. 6A illustrates an example of a perspective view of a wearable device, according to an embodiment.
Figure 6B:
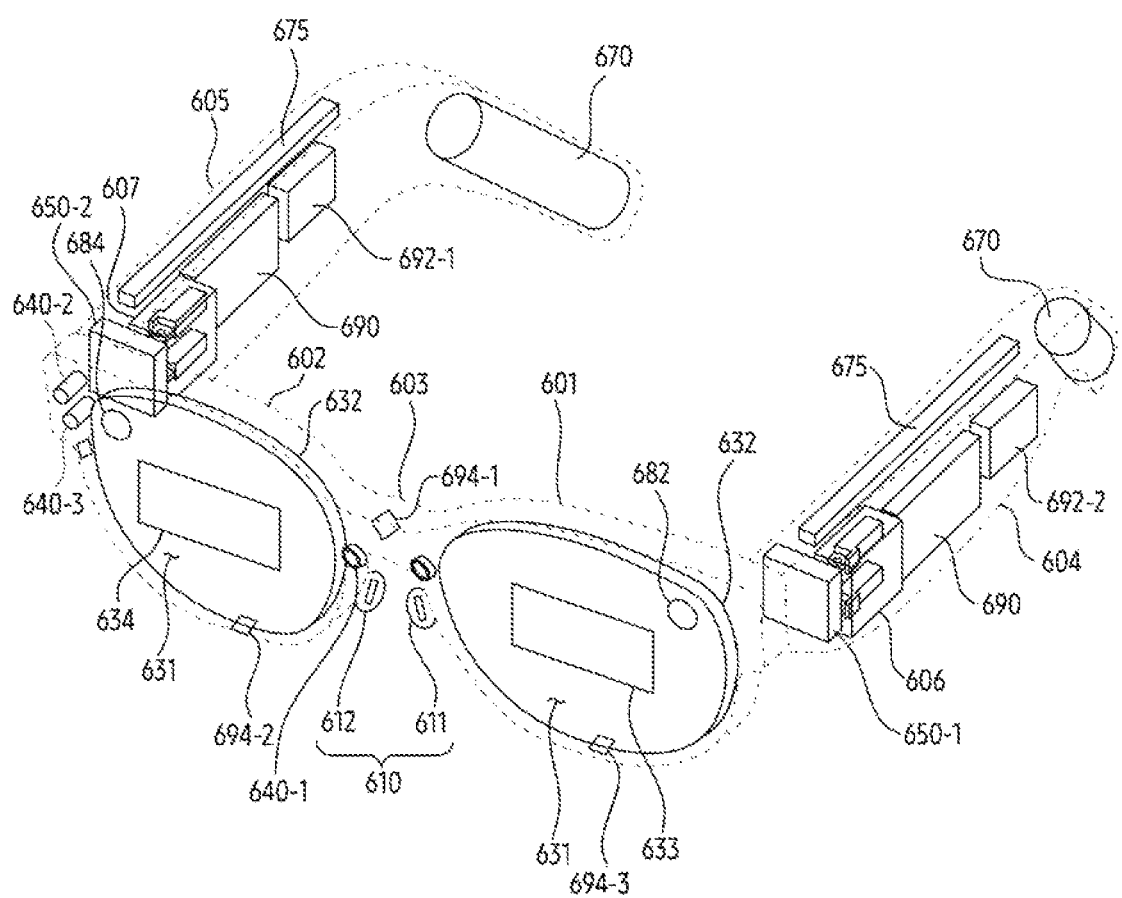
FIG. 6B illustrates an example of hardware components in a wearable device, according to an embodiment.

FIG. 6A illustrates an example of a perspective view of a wearable device 600 according to an embodiment FIG. 6B illustrates an example of hardware components in a wearable device according to an embodiment. The wearable device 600 of FIGS. 6A to 6B may correspond to the electronic device 101 of FIGS. 1, 2, 3, 4A, 4B, 4C and/or FIG. 5. As shown in FIG. 6A, according to an embodiment, the wearable device 600 may include at least one display 650 and a frame supporting the at least one display 650.

According to an embodiment, the wearable device 600 may be wearable on a portion of the user's body. The wearable device 600 may provide the at least one virtual service such as augmented reality (AR), virtual reality (VR), or mixed reality (MR) combining the augmented reality and the virtual reality to a user wearing the wearable device 600. For example, the wearable device 600 may output a virtual reality image to a user through the at least one display 650 in response to a user's preset gesture obtained through a motion recognition camera 640-2 of FIG. 6B.

According to an embodiment, the at least one display 650 in the wearable device 600 may provide visual information to a user. The at least one display 650 may correspond to the display 220 of FIG. 2. For example, the at least one display 650 may include a transparent or translucent lens. The at least one display 650 may include a first display 650-1 and/or a second display 650-2 spaced apart from the first display 650-1. For example, the first display 650-1 and the second display 650-2 may be disposed at positions corresponding to the user's left and right eyes, respectively.

In FIG. 6B, the at least one display 650 may provide another visual information, which is distinct from the visual information, together with the visual information included in the ambient light passing through the lens, a user wearing the wearable device 600, by forming a displaying area on the lens. The lens may be formed based on at least one of a Fresnel lens, a pancake lens, or a multi-channel lens. For example, the displaying area formed by the at least one display 650 may be formed on the second surface 632 among the first surface 631 and the second surface 632 of the lens. When the user wears the wearable device 600, the ambient light may be transmitted to the user by being incident on the first surface 631 and being penetrated through the second surface 632. For another example, the at least one display 650 may display the virtual reality image to be combined with a real screen transmitted through the ambient light. The virtual reality image outputted from the at least one display 650 may be transmitted to the user's eyes through the one or more hardware (e.g., optical devices 682 and 684, and/or at least one waveguides 633 and 634)) included in the wearable device 600.

According to an embodiment, the wearable device 600 may include the waveguides 633 and 634 that diffracts light transmitted from the at least one display 650 and relayed by the optical devices 682 and 684 and transmits it to the user. The waveguides 633 and 634 may be formed based on at least one of glass, plastic, or polymer. A nano-pattern may be formed on at least a portion of the outside or inside of the waveguides 633 and 634. The nano-pattern may be formed based on a grating structure having a polygonal or curved shape. Light incident to one end of the waveguides 633 and 634 may be propagated to the other end of the waveguides 633 and 634 by the nano-pattern. The waveguides 633 and 634 may include at least one of at least one diffraction element (e.g., a diffractive optical element (DOE), a holographic optical element (HOE)), and a reflection element (e.g., a reflection mirror). For example, the waveguides 633 and 634 may be disposed in the wearable device 600 to guide a screen displayed by the at least one display 650 to the user's eyes. For example, the screen may be transmitted to the user's eyes based on total internal reflection (TIR) generated in the waveguides 633 and 634.

According to an embodiment, the wearable device 600 may analyze an object included in a real image collected through a photographing camera 640-1, combine virtual object corresponding to an object that become a subject of augmented reality provision among the analyzed object, and display them on the at least one display 650. The virtual object may include at least one of text and images for various information associated with the object included in the real image. The wearable device 600 may analyze the object based on a multi-camera such as a stereo camera. For the object analysis, the wearable device 600 may execute time-of-flight (ToF) and/or simultaneous localization and mapping (SLAM) supported by the multi-camera. The user wearing the wearable device 600 may watch an image displayed on the at least one display 650.

According to an embodiment, the frame may be configured with a physical structure in which the wearable device 600 may be worn on the user's body. According to an embodiment, the frame may be configured so that when the user wears the wearable device 600, the first display 650-1 and the second display 650-2 may be positioned corresponding to the user's left and right eyes. The frame may support the at least one display 650. For example, the frame may support the first display 650-1 and the second display 650-2 to be positioned at positions corresponding to the user's left and right eyes.

In FIG. 6A, according to an embodiment, the frame may include an area 620 at least partially in contact with the portion of the user's body in case that the user wears the wearable device 600. For example, the area 620 in contact with the portion of the user's body of the frame may include an area contacting a portion of the user's nose, a portion of the user's ear, and a portion of the side of the user's face that the wearable device 600 contacts. According to an embodiment, the frame may include a nose pad 610 that is contacted on the portion of the user's body. When the wearable device 600 is worn by the user, the nose pad 610 may be contacted on the portion of the user's nose. The frame may include a first temple 604 and a second temple 605 that is contacted on another portion of the user's body that is distinct from the portion of the user's body.

For example, the frame may include a first rim 601 surrounding at least a portion of the first display 650-1, a second rim 602 surrounding at least a portion of the second display 650-2, a bridge 603 disposed between the first rim 601 and the second rim 602, a first pad 611 disposed along a portion of the edge of the first rim 601 from one end of the bridge 603, a second pad 612 disposed along a portion of the edge of the second rim 602 from the other end of the bridge 603, the first temple 604 extending from the first rim 601 and fixed to a portion of the wearer's ear, and the second temple 605 extending from the second rim 602 and fixed to a portion of the ear opposite to the ear. The first pad 611 and the second pad 612 may be in contact with the portion of the user's nose, and the first temple 604 and the second temple 605 may be in contact with a portion of the user's face and the portion of the user's ear. The temples 604 and 605 may be rotatably connected to the rim through hinge units 606 and 607 of FIG. 6B. The first temple 604 may be rotatably connected with respect to the first rim 601 through the first hinge unit 606 disposed between the first rim 601 and the first temple 604. The second temple 605 may be rotatably connected with respect to the second rim 602 through the second hinge unit 607 disposed between the second rim 602 and the second temple 605. According to an embodiment, the wearable device 600 may identify an external object (e.g., a user's fingertip) touching the frame and/or a gesture performed by the external object by using a touch sensor, a grip sensor, and/or a proximity sensor formed on at least a portion of the surface of the frame.

According to an embodiment, the wearable device 600 may include hardware components (e.g., hardware described above based on the block diagram of FIG. 2) that perform various functions. For example, the hardware components may include a battery module 670, an antenna module 675, the optical devices 682 and 684, the first speaker 692-1 and the second speaker 692-2, microphones (the first microphone 694-1, the second microphone 694-2, and the third microphone 694-3), a light emitting module, and/or a printed circuit board 690. Various hardware may be disposed in the frame.

According to an embodiment, the microphone (the first microphone 694-1, the second microphone 694-2, and the third microphone 694-3) of the wearable device 600 may obtain a sound signal, by being disposed on at least a portion of the frame. The first microphone 694-1 disposed on the nose pad 610, the second microphone 694-2 disposed on the second rim 602, and the third microphone 694-3 disposed on the first rim 601 are illustrated in FIG. 6B, but the number and disposition of the microphone 694 are not limited to an embodiment of FIG. 6B. In case that the number of the microphone 694 included in the wearable device 600 is two or more, the wearable device 600 may identify the direction of the sound signal by using a plurality of microphones disposed on different portions of the frame.

According to an embodiment, the optical devices 682 and 684 may transmit the virtual object transmitted from the at least one display 650 to the waveguides 633 and 634. For example, the optical devices 682 and 684 may be a projector. The optical devices 682 and 684 may be disposed adjacent to the at least one display 650 or may be included in the at least one display 650 as portion of the at least one display 650. The first optical device 682 may correspond to the first display 650-1, and the second optical device 684 may correspond to the second display 650-2. The first optical device 682 may transmit the light outputted from the first display 650-1 to the first waveguide 633, and the second optical device 684 may transmit light outputted from the second display 650-2 to the second waveguide 634.

In an embodiment, a camera 640 may include an eye tracking camera (ET CAM) 640-1, the motion recognition camera 640-2, and/or the photographing camera 640-3. The photographing camera 640-3, the eye tracking camera 640-1, and the motion recognition camera 640-2 may be disposed at different positions on the frame and may perform different functions. The photographing camera 640-3, the eye tracking camera 640-1, and the motion recognition camera 640-2 may be an example of the camera 240 of FIG. 2. The eye tracking camera 640-1 may output data indicating the gaze of the user wearing the wearable device 600. For example, the wearable device 600 may detect the gaze from an image including the user's pupil obtained through the eye tracking camera 640-1. An example in which the eye tracking camera 640-1 is disposed toward the user's right eye is illustrated in FIG. 6B, but the embodiment is not limited thereto, and the eye tracking camera 640-1 may be disposed alone toward the user's left eye or may be disposed toward two eyes.

In an embodiment, the photographing camera 640-3 may photograph a real image or background to be matched with a virtual image in order to implement the augmented reality or mixed reality content. The photographing camera may capture an image of a specific object existing at a position viewed by the user and may provide the image to the at least one display 650. The at least one display 650 may display one image in which a virtual image provided through the optical devices 682 and 684 is overlapped with information on the real image or background including an image of the specific object obtained by using the photographing camera. In an embodiment, the photographing camera may be disposed on the bridge 603 disposed between the first rim 601 and the second rim 602.

In an embodiment, the eye tracking camera 640-1 may implement a more realistic augmented reality by matching the user's gaze with the visual information provided on the at least one display 650 by tracking the gaze of the user wearing the wearable device 600. For example, when the user looks at the front, the wearable device 600 may naturally display environment information associated with the user's front on the at least one display 650 at the position where the user is positioned. The eye tracking camera 640-1 may be configured to capture an image of the user's pupil in order to determine the user's gaze. For example, the eye tracking camera 640-1 may receive gaze detection light reflected from the user's pupil and may track the user's gaze based on the position and movement of the received gaze detection light. In an embodiment, the eye tracking camera 640-1 may be disposed at a position corresponding to the user's left and right eyes. For example, the eye tracking camera 640-1 may be disposed in the first rim 601 and/or the second rim 602 to face the direction in which the user wearing the wearable device 600 is positioned.

In an embodiment, the motion recognition camera 640-2 may provide a specific event to the screen provided on the at least one display 650 by recognizing the movement of the whole or portion of the user's body, such as the user's torso, hand, or face. The motion recognition camera 640-2 may obtain a signal corresponding to the gesture by recognizing the user's gesture, and may provide a display corresponding to the signal to the at least one display 650. The processor may identify a signal corresponding to the operation and may perform a preset function based on the identification. In an embodiment, the motion recognition camera 640-2 may be disposed on the first rim 601 and/or the second rim 602.

In an embodiment, the camera 640 included in the wearable device 600 is not limited to the above-described eye tracking camera (ET CAM) 640-1 and motion recognition camera 640-2. For example, the wearable device 600 may identify an external object included in the FoV, by using the photographing camera 640-3 disposed toward the user's FoV. That the wearable device 600 identifies the external object may be performed based on a sensor for identifying a distance between the wearable device 600 and the external object, such as a depth sensor and/or a time of flight (ToF) sensor. The camera 640 disposed toward the FoV may support an autofocus function and/or an optical image stabilization (OIS) function. For example, the wearable device 600 may include the camera 640 (e.g., a face tracking (FT) camera) disposed toward the face, in order to obtain an image including the face of the user wearing the wearable device 600.

In one embodiment, the wearable device 600 according to an embodiment may further include a light source (e.g., LED) that emits light toward a subject (e.g., user's eyes, face, and/or an external object in the FoV) photographed by using the camera 640. The light source may include an LED having an infrared wavelength. The light source may be disposed on at least one of the frame, and the hinge units 606 and 607.

According to an embodiment, the battery module 670 may supply power to electronic components of the wearable device 600. In an embodiment, the battery module 670 may be disposed in the first temple 604 and/or the second temple 605. For example, the battery module 670 may be a plurality of battery modules 670. The plurality of battery modules 670, respectively, may be disposed on each of the first temple 604 and the second temple 605. In an embodiment, the battery module 670 may be disposed at an end of the first temple 604 and/or the second temple 605.

In an embodiment, the antenna module 675 may transmit the signal or power to the outside of the wearable device 600 or may receive the signal or power from the outside. The antenna module 675 may be electronically and/or operably connected to a communication circuit (e.g., the communication circuit 230 of FIG. 2) of the wearable device 600. In an embodiment, the antenna module 675 may be disposed in the first temple 604 and/or the second temple 605. For example, the antenna module 675 may be disposed close to one surface of the first temple 604 and/or the second temple 605.

In an embodiment, the first speaker 692-1 and the second speaker 692-2 may output a sound signal to the outside of the wearable device 600. A sound output module may be referred to as a speaker. In an embodiment, the first speaker 692-1 and the second speaker 692-2 may be disposed in the first temple 604 and/or the second temple 605 in order to be disposed adjacent to the ear of the user wearing the wearable device 600. For example, the wearable device 600 may include the second speaker 692-2 disposed adjacent to the user's left ear by being disposed in the first temple 604, and the first speaker 692-1 disposed adjacent to the user's right ear by being disposed in the second temple 605.

In an embodiment, the light emitting module may include at least one light emitting element. The light emitting module may emit light of a color corresponding to a specific state or may emit light through an operation corresponding to the specific state in order to visually provide information on a specific state of the wearable device 600 to the user. For example, in case that the wearable device 600 needs charging, it may repeatedly emit red light at a preset timing. In an embodiment, the light emitting module may be disposed on the first rim 601 and/or the second rim 602.

In FIG. 6B, according to an embodiment, the wearable device 600 may include the printed circuit board (PCB) 690. The PCB 690 may be included in at least one of the first temple 604 or the second temple 605. The PCB 690 may include an interposer disposed between at least two sub PCBs. On the PCB 690, one or more hardware (e.g., hardware illustrated by the blocks described above with reference to FIG. 2) included in the wearable device 600 may be disposed. The wearable device 600 may include a flexible PCB (FPCB) for interconnecting the hardware.

According to an embodiment, the wearable device 600 may include at least one of a gyro sensor, a gravity sensor, and/or an acceleration sensor for detecting the posture of the wearable device 600 and/or the posture of a body part (e.g., a head) of the user wearing the wearable device 600. Each of the gravity sensor and the acceleration sensor may measure gravity acceleration, and/or acceleration based on preset 6-dimensional axes (e.g., x-axis, y-axis, and z-axis) perpendicular to each other. The gyro sensor may measure angular velocity of each of preset 6-dimensional axes (e.g., x-axis, y-axis, and z-axis). At least one of the gravity sensor, the acceleration sensor, and the gyro sensor may be referred to as an inertial measurement unit (IMU). According to an embodiment, the wearable device 600 may identify the user's motion and/or gesture performed to execute or stop a specific function of the wearable device 600 based on the IMU.

As described above, according to an embodiment, the wearable device 600 may display a first virtual object corresponding to the user of the external electronic device, while providing a screen related to the virtual reality service, through the display 650. The wearable device 600 may identify a distance between the first virtual object and a second virtual object corresponding to the user of the wearable device 600. The wearable device 600 may activate cameras 640-1 and 640-2 based on the fact that the distance between the first virtual object and the second virtual object is within a reference distance. The wearable device 600 may identify the state of the user, based on at least one image obtained by using the activated cameras 640-1 and 640-2. Based on the identified state of the user, the wearable device 600 may transmit data for changing the state of the second virtual object corresponding to the user of the wearable device 600 displayed through the display of the external electronic device based on the identified state of the user, to the external electronic device. The wearable device 600 may enhance the user experience of the wearable device 600 and the external electronic device by transmitting data for changing the state of the second virtual object based on the at least one image.

Figure 7A:
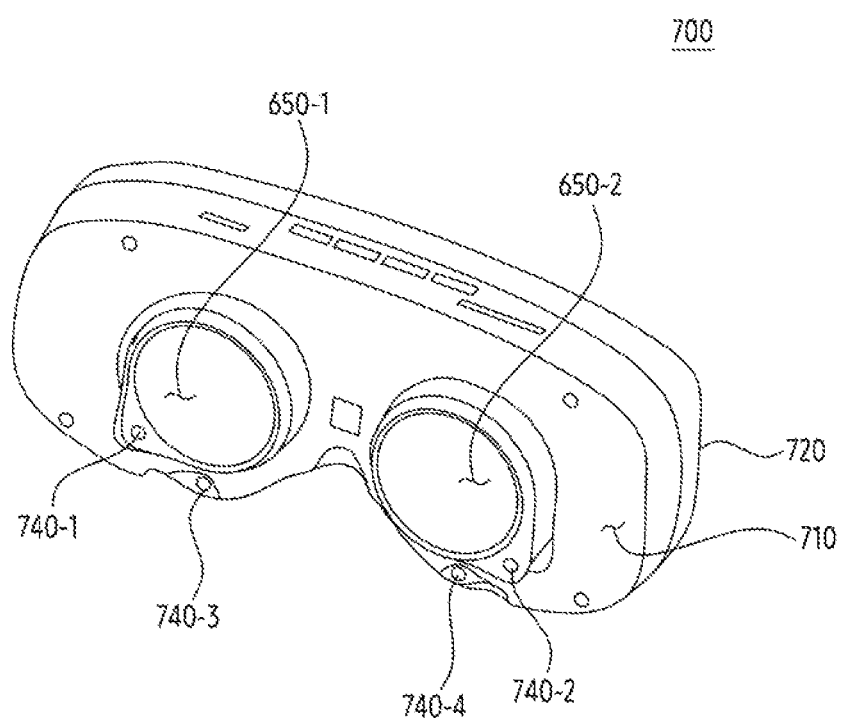
FIGS. 7A to 7B illustrate an example of the appearance of a wearable device, according to an embodiment.
Figure 7B:
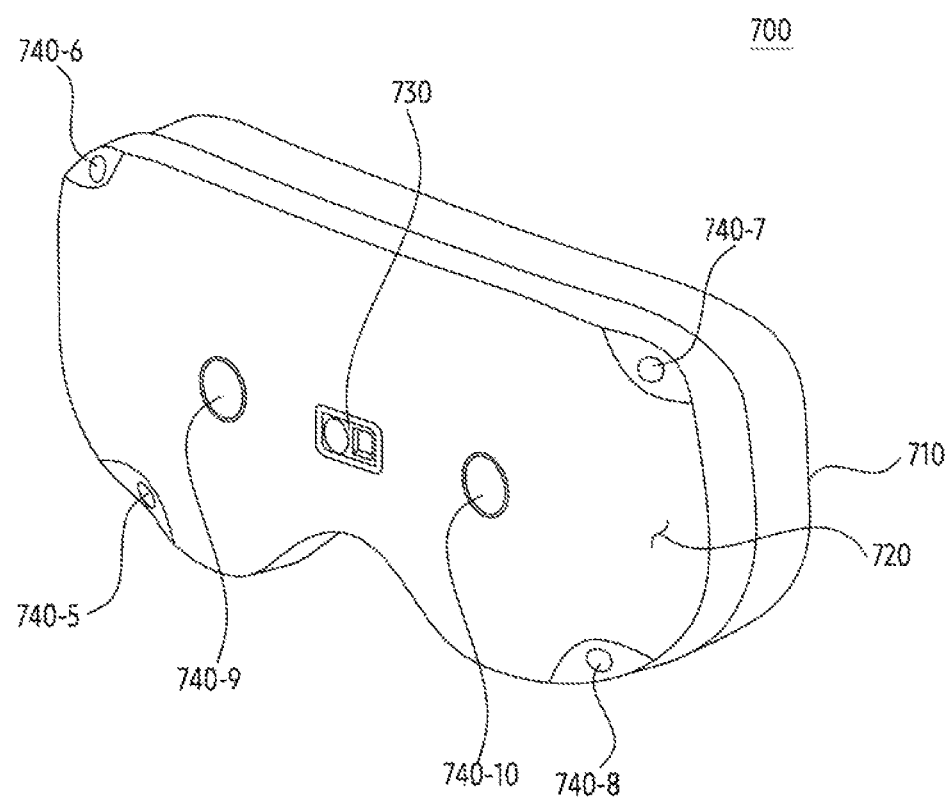

FIGS. 7A to 7B illustrate an example of the appearance of a wearable device according to an embodiment. A wearable device 700 of FIGS. 7A to 7B may correspond to the wearable device 101 of FIG. 1 and FIG. 2. According to an embodiment, an example of an appearance of a first surface 710 of the housing of the wearable device 700 may be illustrated in FIG. 7A, and an example of an appearance of a second surface 720 opposite to the first surface 710 may be illustrated in FIG. 7B.

In FIG. 7A, according to an embodiment, the first surface 710 of the wearable device 700 may have an attachable shape on the user's body part (e.g., the user's face). In one embodiment, the wearable device 700 may further include a strap for being fixed on the user's body part, and/or one or more temples (e.g., a first temple 604 and/or a second temple 605 of FIGS. 3A to 3B). A first display 650-1 for outputting an image to the left eye among the user's two eyes and a second display 650-2 for outputting an image to the right eye among the user's two eyes may be disposed on the first surface 710. The wearable device 700 may be formed on the first surface 710 and may further include rubber or silicon packing for preventing interference by light (e.g., ambient light) different from the light emitted from the first display 650-1 and the second display 650-2.

According to an embodiment, the wearable device 700 may include cameras 740-3 and 740-4 for photographing and/or tracking two eyes of the user adjacent to each of the first display 650-1 and the second display 650-2. The cameras 740-3 and 740-4 may be referred to as ET cameras. According to an embodiment, the wearable device 700 may include cameras 740-1 and 740-2 for photographing and/or recognizing the user's face. The cameras 740-1 and 740-2 may be referred to as FT cameras.

In FIG. 7B, a camera (e.g., cameras 740-5, 740-6, 740-7, 740-8, 740-9, and 740-10), and/or a sensor (e.g., a depth sensor 730) for obtaining information associated with the external environment of the wearable device 700 may be disposed on the second surface 720 opposite to the first surface 710 of FIG. 7A. For example, the cameras 740-5, 740-6, 740-7, 740-8, 740-9, and 740-10 may be disposed on the second surface 720 in order to recognize an external object different from the wearable device 700. For example, by using cameras 740-9, and 740-10, the wearable device 700 may obtain an image and/or video to be transmitted to each of the user's two eyes. The camera 740-9 may be disposed on the second surface 720 of the wearable device 700 to obtain an image to be displayed through the second display 60-2 corresponding to the right eye among the two eyes. The camera 740-10 may be disposed on the second surface 720 of the wearable device 700 to obtain an image to be displayed through the first display 650-1 corresponding to the left eye among the two eyes.

According to an embodiment, the wearable device 700 may include the depth sensor 730 disposed on the second surface 720 in order to identify a distance between the wearable device 700 and the external object. By using the depth sensor 730, the wearable device 700 may obtain spatial information (e.g., a depth map) about at least a portion of the FoV of the user wearing the wearable device 700.

In one embodiment, a microphone for obtaining sound outputted from the external object may be disposed on the second surface 720 of the wearable device 700. The number of microphones may be one or more depending on embodiments.

As described above, according to an embodiment, the wearable device 700 may display a screen related to the at least one virtual service (e.g., a VR service) through the display 650. The wearable device 700 may display a first virtual object corresponding to the user of the external electronic device on the screen. The wearable device 700 may identify a distance between the first virtual object and a second virtual object corresponding to the user of the wearable device 700. The wearable device 700 may activate the cameras 740, based on the fact that the distance between the first virtual object and the second virtual object is within a reference distance. The wearable device 700 may identify the state of the user, based on at least one image obtained by using the activated cameras 740. Based on the identified state of the user, the wearable device 700 may transmit data for changing the state of the second virtual object corresponding to the user of the wearable device 700 displayed through the display of the external electronic device, to the external electronic device. The wearable device 700 may enhance the user experience of the wearable device 700 and the external electronic device by transmitting data for changing the state of the second virtual object based on the at least one image.

Figure 8:
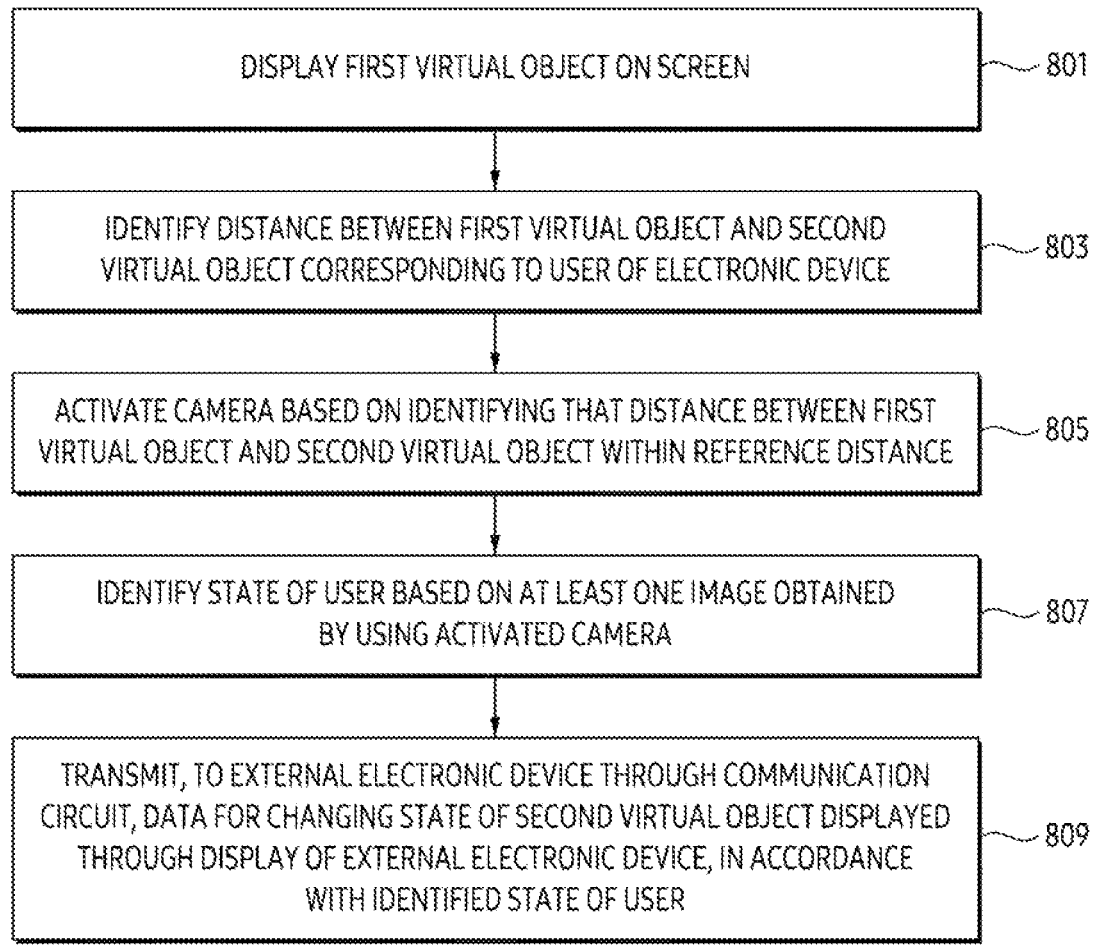
FIG. 8 illustrates operations of an electronic device, according to an embodiment.

FIG. 8 illustrates operations of an electronic device, according to an embodiment. The electronic device of FIG. 8 may include an electronic device 101 of FIGS. 1, 2, 3, 4A, 4B, 4C, and/or 5. The electronic device of FIG. 8 may include a wearable device 600 of FIGS. 6A and 6B and/or a wearable device 700 of FIGS. 7A and 7B. Operations of FIG. 8 may be performed by a processor 210 of FIG. 2.

In FIG. 8, in operation 801, according to an embodiment, the electronic device may provide a virtual reality service through a display (or a screen). The electronic device 101 may display a first virtual object (corresponding to an external electronic device) on the screen while displaying the screen related to the at least one virtual service through the display.

In operation 803, according to an embodiment, the electronic device may identify a distance between the first virtual object and a second virtual object corresponding to a user (e.g., a user 105 of FIG. 1) of the electronic device. For example, the electronic device may identify a distance between the first virtual object and the second virtual object based on a size of the first virtual object displayed through the display. For example, the electronic device may identify the distance based on a first coordinate value of the first virtual object and a second coordinate value of the second virtual object. For example, the electronic device may identify the distance based on Equation 1 described in FIG. 1.

In operation 805, according to an embodiment, the electronic device may identify the distance between the first virtual object and the second virtual object within a reference distance. The electronic device may activate a camera (e.g., a camera 240 of FIG. 2) based on identifying that the distance between the first virtual object and the second virtual object is within the reference distance. For example, the electronic device may activate the camera, based on identifying that that the size of the first virtual object displayed through the display is greater than the reference size.

In operation 807, according to an embodiment, the electronic device may obtain at least one image by using the activated camera. The electronic device may identify a state of the user of the electronic device based on the at least one image. In operation 809, based on the identified state of the user, the electronic device may transmit data for changing the state of the second virtual object corresponding to the user displayed through the display of the external electronic device, to the external electronic device through a communication circuit (e.g., a communication circuit 230 of FIG. 2). For example, the identified state of the user may be related to a body motion of the user and/or a face motion of the user.

As described above, according to an embodiment, the electronic device may activate the camera based on identifying that the distance between the first virtual object and the second virtual object is within the reference distance. The electronic device may reduce power consumption by activating the camera in response to the distance within the reference distance. The electronic device may enhance the user experience of the electronic device and the external electronic device by transmitting the data for changing the state of the second virtual object based on the state of the user.

Figure 9:
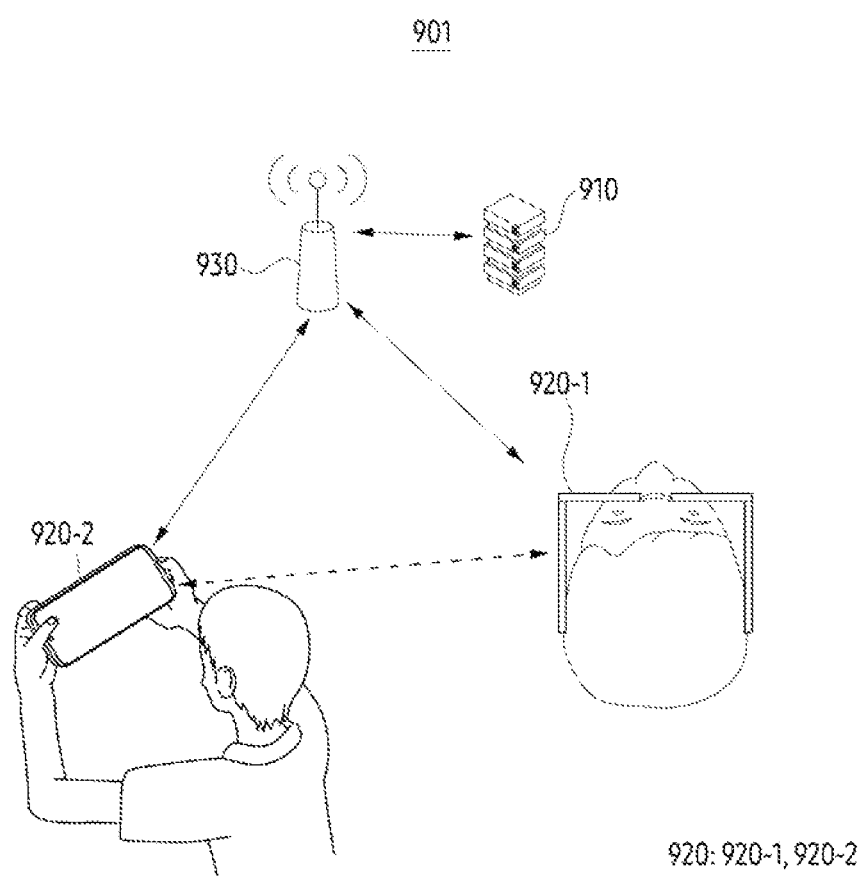
FIG. 9 illustrates a network environment in which a metaverse service is provided through a server.

FIG. 9 illustrates a network environment 901 that receives at least one virtual service or a 'metaverse' service through a server 910.

Metaverse is a combination of the English words Meta, which means "virtual" and "transcendence," and "Universe," which means the universe, and refers to a three-dimensional virtual world where social, economic, and cultural activities like the real world take place. Metaverse is a concept that has evolved one step further than virtual reality, and it is characterized by using avatars to not only enjoy games or virtual reality (VR, cutting-edge technology that enables people to experience real-life experiences in a computerized virtual world), but also social and cultural activities like real reality. Metaverse service may provide media content to enhance immersion in the virtual world, based on augmented reality (AR), virtual reality environment (VR), mixed environment (MR), and/or extended reality (XR).

For example, the media content provided by metaverse service may include social interaction content including a game, a concert, a party, and/or a conference based on an avatar. For example, the media content may include information for economic activities such as advertising, user-created content, and/or sales of products and/or shopping. Ownership of the user-created content may be proved by a blockchain-based non-fungible token (NFT). The metaverse service may support economic activities based on real money and/or cryptocurrency. Virtual content linked to the real world, such as digital twin or life logging, may be provided by the metaverse service.

In FIG. 9, the network environment 901 may include a server 910, a user terminal 920 (e.g., a first terminal 920-1 and a second terminal 920-2), and a network connecting the server 910 and the user terminal 920. In the network environment 901, the server 910 may provide a metaverse service to the user terminal 920. The network may be formed by at least one intermediate node 930 including an access point (AP) and/or a base station. The user terminal 920 may access the server 910 through a network and output a user interface (UI) associated with the metaverse service to the user of the user terminal 920. Based on the UI, the user terminal 920 may obtain information to be inputted into the metaverse service from the user or output information associated with the metaverse service (e.g., multimedia content) to the user.

In this case, the server 910 provides a virtual space so that the user terminal 920 may perform activities in the virtual space. In addition, the user terminal 920 may represent information provided by the server 910 to the user or transmit information in which the user wants to represent in the virtual space to the server, by installing S/W agent to access a virtual space provided by the server 910. The S/W agent may be provided directly through the server 910, downloaded from a public server, or embedded and provided when purchasing a terminal.

In an embodiment, the metaverse service may be provided to the user terminal 920 and/or the user by using the server 910. The embodiment is not limited thereto, and the metaverse service may be provided through individual contact between users. For example, within the network environment 901, the metaverse service may be provided by a direct connection between the first terminal 920-1 and the second terminal 920-2, independently of the server 910. In FIG. 9, in the network environment 901, the first terminal 920-1 and the second terminal 920-2 may be connected to each other through a network formed by at least one intermediate node 930. In an embodiment where the first terminal 920-1 and the second terminal 920-2 are directly connected, any one user terminal of the first terminal 920-1 and the second terminal 920-2 may serve as the server 910. For example, a metaverse environment may be configured only with a device-to-device connection (e.g., a peer-to-peer (P2P) connection).

In an embodiment, the user terminal 920 (or the user terminal 920 including the first terminal 920-1 and the second terminal 920-2) may be made into various form factors, and may be characterized by including an input device for inputting information to the metaverse service and an output device that provides video and/or sound to the user. Examples of various form factors of the user terminal 920 include a smartphone (e.g., the second terminal 920-2), an AR device (e.g., the first terminal 920-1), a VR device, an MR device, a video see-through (VST) device, an optical see-through (OST) device, a smart lens, a smart mirror, a TV or a projector capable of input/output.

Network (e.g., a network formed by at least one intermediate node 930) include various broadband networks including 3G, 4G, and 5G, a short-range networks including Wi-fi and BT (e.g., a wired network or a wireless network that directly connect the first terminal 920-1 and the second terminal 920-2).

A method for strengthening the user experience of the electronic device 101 and reducing power consumption may be required. As described above, according to an embodiment, an electronic device may comprise a communication circuit 230, a camera 240, a display 220, and a processor 210. The processor 210 may display, while providing at least one virtual service, a first virtual object 120 through the display 220. The processor 210 may identify a distance between the first virtual object 120 and a second virtual object 110 corresponding to a user of the electronic device 101. The processor 210 may activate the camera 240 in response to the distance in a reference distance. The processor 210 may, in response to identifying a state of the user based on at least one image 150 obtained by using the activated camera 240, transmit, to an external electronic device 101 through the communication circuit 230, data for changing a state of the second virtual object 110 corresponding to the user displayed through a display 220 of the external electronic device 101 based on the state of the user.

According to an embodiment, the processor 210 may identify a size of the first virtual object 120 displayed through the display 220. The processor 210 may identify, based on identifying a size of the first virtual object greater 120 than a reference size, the distance in the reference distance.

According to an embodiment, the processor 210 may identify, based on an input indicating to select the first virtual object 120, the distance between the first virtual object 120 and the second virtual object 110.

According to an embodiment, the processor 210 may identify the distance based on the input indicating to select the first virtual object 120 among one or more virtual objects.

According to an embodiment, the processor 210 may deactivate the activated camera 240 in response to the distance farther than the reference distance.

According to an embodiment, the processor 210 may identify, based on a first coordinate value indicating a location of the first virtual object 120 and a second coordinate value indicating a location of the second virtual object 110, the distance.

According to an embodiment, the processor 210 may display a visual object representing activation of the camera 240 through the display 220 in response to activation of the camera 240.

According to an embodiment, the processor 210 may control, based on identifying the distance farther than the reference distance, the second virtual object 110 based on a controller where a communication link is established through the communication circuit 230.

As described above, according to an embodiment, a method of an electronic device 101 may comprise displaying, while providing at least one virtual service, a first virtual object 120 through a display 220. The method may comprise identifying a distance between the first virtual object 120 and a second virtual object 110 corresponding to a user of the electronic device 101. The method may comprise activating a camera 240 in response to the distance in a reference distance. The method may comprise, in response to identifying a state of the user based on at least one image 150 obtained by using the activated camera 240, transmitting, to an external electronic device 101 through a communication circuit 230, data for changing a state of the second virtual object 110 corresponding to the user displayed through a display 220 of the external electronic device 101 based on the state of the user.

According to an embodiment, the method may comprise identifying a size of the first virtual object 120 displayed through the display 220. The method may comprise identifying, based on identifying a size of the first virtual object 120 greater than a reference size, the distance in the reference distance.

According to an embodiment, the method may comprise identifying, based on an input indicating to select the first virtual object 120, the distance between the first virtual object 120 and the second virtual object 110.

According to an embodiment, the method may comprise identifying the distance based on the input indicating to select the first virtual object 120 among one or more virtual objects.

According to an embodiment, the method may comprise deactivating the activated camera 240 in response to the distance farther than the reference distance.

According to an embodiment, the method may comprise identifying, based on a first coordinate value indicating a location of the first virtual object 120 and a second coordinate value indicating a location of the second virtual object 110, the distance.

According to an embodiment, the method may comprise displaying a visual object representing activation of the camera 240 through the display 220 in response to activation of the camera 240.

According to an embodiment, the method may comprise controlling, based on identifying the distance farther than the reference distance, the second virtual object 110 based on a controller where a communication link is established through the communication circuit 230.

As described above, according to an embodiment, a computer-readable storage medium storing one or more programs, wherein the one or more programs, when being executed by a processor 210 of an electronic device 101, may cause the processor 210 of the electronic device 101 to display, while providing at least one virtual service, a first virtual object 120 through a display 220. The one or more programs, when being executed by the processor 210 of the electronic device 101, may cause the processor 210 of the electronic device 101 to identify a distance between the first virtual object 120 and a second virtual object 110 corresponding to a user of the electronic device 101. The one or more programs, when being executed by the processor 210 of the electronic device 101, may cause the processor 210 of the electronic device 101 to activate a camera 240 in response to the distance in a reference distance. The one or more programs, when being executed by the processor 210 of the electronic device 101, may cause the processor 210 of the electronic device 101 to, in response to identifying a state of the user based on at least one image 150 obtained by using the activated camera 240, transmit, to an external electronic device 101 through a communication circuit 230, data for changing a state of the second virtual object 110 corresponding to the user displayed through a display 220 of the external electronic device 101 based on the state of the user.

According to an embodiment, the one or more programs, when being executed by the processor 210 of the electronic device 101, may cause the processor 210 of the electronic device 101 to identify a size of the first virtual object 120 displayed through the display 220. The one or more programs, when being executed by the processor 210 of the electronic device 101, may cause the processor 210 of the electronic device 101 to identify, based on identifying a size of the first virtual object 120 greater than a reference size, the distance in the reference distance.

According to an embodiment, the one or more programs, when being executed by the processor 210 of the electronic device 101, may cause the processor 210 of the electronic device 101 to identify, based on an input indicating to select the first virtual object 120, the distance between the first virtual object 120 and the second virtual object 110.

According to an embodiment, the one or more programs, when being executed by the processor 210 of the electronic device 101, may cause the processor 210 of the electronic device 101 to identify the distance based on the input indicating to select the first virtual object 120 among one or more virtual objects.

The electronic device according to one or more embodiments disclosed in the disclosure may be various types of devices. The electronic device may include, for example, a portable communication device (e.g., a smartphone), a computer device, a portable multimedia device, a portable medical device, a camera, an electronic device, or a home appliance. The electronic device according to an embodiment of the disclosure is not limited to the above-described devices.

The one or more embodiments of the disclosure and terms used herein are not intended to limit the technical features described in the disclosure to specific embodiments, and should be understood to include various modifications, equivalents, or substitutes of the embodiment. In relation to the description of the drawings, a similar reference numeral may be used for a similar or related component. The singular form of the noun corresponding to the item may include one or a plurality of items unless explicitly indicated differently in the context involved. In the disclosure, each of the phrases such as "A or B", "at least one of A and B", "at least one of A or B", "A, B or C", "at least one of A, B and C", and "at least one of A, B or C" may include any one among the items listed together with the corresponding phrase among the phrases, or all possible combinations thereof. Terms such as "1st", "2nd", or "the first", or "the second" may be used simply to distinguish a corresponding component from another corresponding component, and do not limit the corresponding component to other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

The term "module" used in one or more embodiments of the disclosure may include units implemented in hardware, software, or firmware, and may be used interchangeably with terms such as logic, logic block, component, or circuit, for example. The module may be an integrally configured component or a minimum unit of the component or a part thereof that performs one or more functions. For example, according to an embodiment, the module may be implemented in the form of an application-specific integrated circuit (ASIC).

One or more embodiments of the disclosure may be implemented as a software (e.g., a program) including one or more instructions stored in a storage medium (e.g., an internal memory or an external memory) that may be read by a machine (e.g., an electronic device 101). For example, a processor (e.g., the processor 210) of the machine (e.g., the electronic device 101) may call at least one instruction among one or more instructions stored from the storage medium and execute it. This makes it possible for the machine to be operated to perform at least one function according to the at least one instruction called. The one or more instructions may include code generated by a compiler or code that may be executed by an interpreter. The machine-readable storage medium may be provided in the form of a non-transitory storage medium. Here, 'non-transitory' only means that the storage medium is a tangible device and does not include a signal (e.g., electromagnetic waves), and this term does not distinguish between a case where data is semi-permanently stored in the storage medium and a case where data is temporarily stored.

According to an embodiment, a method according to one or more embodiments disclosed in the disclosure may be included in a computer program product and provided. The computer program product may be traded between a seller and a buyer as a product. The computer program product may be distributed in the form of machine-readable storage medium (e.g., compact disc read only memory (CD-ROM)), or may be distributed (e.g., downloaded or uploaded) online, through an application store (e.g., Play Store™) or directly between two user devices (e.g., smartphones). In case of the online distribution, at least a portion of the computer program product may be at least temporarily stored or temporarily generated in the machine-readable storage medium, such as the memory of a manufacturer's server, an application store's server, or a relay server.

According to one or more embodiments, each component (e.g., module or program) of the above-described components may include a single or plural entity, and some of the plurality of entities may be separately disposed in other components. According to one or more embodiments, one or more components among the above-described corresponding components or operations may be omitted, or one or more other components or operations may be added. Alternatively or additionally, a plurality of components (e.g., module or program) may be integrated into one component. In this case, the integrated component may perform one or more functions of each component of the plurality of components identically or similarly to those performed by the corresponding component among the plurality of components prior to the integration. According to one or more embodiments, the operations performed by a module, program, or other component may be executed sequentially, in parallel, iteratively, or heuristically, or one or more of the above operations may be executed in a different order, omitted, or one or more other operations may be added.

What is claimed is:

1. A head-wearable electronic device, comprising:
    communication circuitry;
    at least one display configured to be positioned in front of eyes of a user wearing the head-wearable electronic device;
    at least one camera configured to obtain an image usable for identifying a user gesture;
    memory comprising one or more storage media storing instructions; and
    at least one processor comprising processing circuitry, wherein the instructions, when executed by the at least one processor individually or collectively, cause the head-wearable electronic device to:
        display, via the at least one display, a first avatar corresponding to another user different from the user of the head-wearable electronic device;
        while displaying the first avatar, identify a distance between the first avatar and a second avatar corresponding to the user;
        based on the distance being a first distance equal to or smaller than a reference distance, transmit, to an electronic device of the other user, information indicating the user gesture to be applied to the second avatar displayed in the electronic device of the other user; and
        based on the distance being a second distance longer than the reference distance, transmit, to the electronic device of the other user, another information to control the motion of the second avatar, the other information being generated based on a controller coupled through the communication circuitry.

2. The head-wearable electronic device of claim 1, wherein the instructions, when executed by the at least one processor, further cause the head-wearable electronic device to:
    based on the first avatar being displayed in a first size, determine that the distance corresponds to the first distance; and
    based on the first avatar being displayed in a second size smaller than the first size, determine that the distance corresponds to the second distance.

3. The head-wearable electronic device of claim 1, wherein the instructions, when executed by the at least one processor, further cause the head-wearable electronic device to, based on an input indicating to select the first avatar, identify the distance.

4. The head-wearable electronic device of claim 1, wherein the instructions, when executed by the at least one processor, further cause the head-wearable electronic device to identify the distance based on an input indicating to select the first avatar among one or more avatars.

5. The head-wearable electronic device of claim 1,
    wherein the instructions, when executed by the at least one processor, further cause the head-wearable electronic device to:
    based on the distance being the first distance which is equal to or smaller than the reference distance, activate the at least one camera to obtain the information; and
    based on the distance being the second distance which is longer than the reference distance when the at least one camera is activated, deactivate the activated at least one camera.

6. The head-wearable electronic device of claim 1, wherein the instructions, when executed by the at least one processor, further cause the head-wearable electronic device to identify, based on a first coordinate value indicating a first location of the first avatar and a second coordinate value indicating a second location of the second avatar, the distance.

7. The head-wearable electronic device of claim 1, wherein the instructions, when executed by the at least one processor, further cause the head-wearable electronic device to, based on the at least one camera being activated, display, through the at least one display, an icon indicating that the at least one camera is activated.

8. The head-wearable electronic device of claim 1, wherein the instructions, when executed by the at least one processor, further cause the head-wearable electronic device to, based on identifying that the distance is greater than the reference distance, control the second avatar based on the controller.

9. A method performed by a head-wearable electronic device comprising communication circuitry, at least one display configured to be positioned in front of eyes of a user wearing the head-wearable electronic device, and at least one camera configured to obtain an image usable for identifying a user gesture, the method comprising:

displaying, via the at least one display, a first avatar corresponding to another user different from the user of the head-wearable electronic device;

while displaying the first avatar, identifying a distance between the first avatar and a second avatar corresponding to the user;

based on the distance being a first distance equal to or smaller than a reference distance, transmitting, to an electronic device of the other user, information indicating the user gesture to be applied to the second avatar displayed in the electronic device of the other user; and based on the distance being a second distance longer than the reference distance, transmitting, to the electronic device of the other user, another information to control the motion of the second avatar, the other information is generated based on a controller coupled through the communication circuitry.

10. The method of claim 9, further comprising:

based on the first avatar being displayed in a first size, determining that the distance corresponds to the first distance; and based on the first avatar being displayed in a second size smaller than the first size, determining that the distance corresponds to the second distance.

11. The method of claim 9, wherein the identifying the distance comprises, based on an input indicating to select the first avatar, identifying the distance.

12. The method of claim 9, wherein the identifying the distance comprises, identifying the distance based on an input indicating to select the first avatar among one or more avatars.

13. The method of claim 9, further comprising:

based on the distance being the first distance which is equal to or smaller than the reference distance, activating the at least one camera to obtain the information; and based on the distance being the second distance which is longer than the reference distance when the at least one camera is activated, deactivating the activated at least one camera.

14. The method of claim 9, wherein the identifying the distance comprises, based on a first coordinate value indicating a location of the first avatar and a second coordinate value indicating a location of the second avatar, identifying the distance.

15. The method of claim 9, further comprising, based on the at least one camera being activated, displaying, through the at least one display, an icon indicating that the at least one camera is activated.

16. The method of claim 9, further comprising, based on identifying the distance is greater than the reference distance, controlling the second avatar by using the controller.

17. A non-transitory computer-readable storage medium storing one or more programs, wherein the one or more programs, when executed by a head-wearable electronic device comprising communication circuitry, at least one display configured to be positioned in front of eyes of a user wearing the head-wearable electronic device, and at least one camera configured to obtain an image usable for identifying a user gesture, cause the head-wearable electronic device to:

display, via the at least one display, a first avatar corresponding to another user different from the user of the head-wearable electronic device;

while displaying the first avatar, identify a distance between the first avatar and a second avatar corresponding to the user;

based on the distance being a first distance equal to or smaller than a reference distance, transmit, to an electronic device of the other user, information indicating the user gesture to be applied to the second avatar displayed in the electronic device of the other user; and based on the distance being a second distance longer than the reference distance, transmit, to the electronic device of the other user, another information to control the motion of the second avatar, the other information is generated based on a controller coupled through the communication circuitry.

18. The non-transitory computer-readable storage medium of claim 17, wherein the one or more programs, when executed by the head-wearable electronic device, further cause the head-wearable electronic device to:

based on the first avatar being displayed in a first size, determine that the distance corresponds to the first distance; and based on the first avatar being display in a second size smaller than the first size, determine that the distance corresponds to the second distance.

19. The non-transitory computer-readable storage medium of claim 17, wherein the one or more programs, when executed by the head-wearable electronic device, further cause the head-wearable electronic device to, based on an input indicating to select the first avatar, identify the distance.

20. The non-transitory computer-readable storage medium of claim 17, wherein the one or more programs, when executed by the head-wearable electronic device, further cause the head-wearable electronic device to: based on an input indicating to select the first avatar among one or more avatars, identify the distance.

* * * * *